(12) United States Patent
Yoshida et al.

(10) Patent No.: US 10,906,993 B2
(45) Date of Patent: Feb. 2, 2021

(54) MODIFIED CELLULOSE FIBERS

(71) Applicant: KAO CORPORATION, Tokyo (JP)

(72) Inventors: Yutaka Yoshida, Wakayama (JP);
Shotaro Shibata, Wakayama (JP);
Yoshiaki Kumamoto, Wakayama (JP);
Takuma Tsuboi, Wakayama (JP);
Motoi Konishi, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

(21) Appl. No.: 15/757,700

(22) PCT Filed: Sep. 5, 2016

(86) PCT No.: PCT/JP2016/076057
§ 371 (c)(1),
(2) Date: Mar. 6, 2018

(87) PCT Pub. No.: WO2017/043454
PCT Pub. Date: Mar. 16, 2017

(65) Prior Publication Data
US 2019/0169314 A1    Jun. 6, 2019

(30) Foreign Application Priority Data

Sep. 7, 2015   (JP) .................. 2015-176045
Sep. 7, 2015   (JP) .................. 2015-176046
Sep. 7, 2015   (JP) .................. 2015-176047
Sep. 7, 2015   (JP) .................. 2015-176048

(51) Int. Cl.
| | | |
|---|---|---|
| C08B 11/193 | (2006.01) | |
| C08L 9/06 | (2006.01) | |
| C08L 23/06 | (2006.01) | |
| C08L 25/06 | (2006.01) | |
| C08L 75/16 | (2006.01) | |
| C08L 9/02 | (2006.01) | |
| C08L 1/28 | (2006.01) | |
| C08L 7/00 | (2006.01) | |
| C08L 63/00 | (2006.01) | |
| C08L 75/14 | (2006.01) | |

(52) U.S. Cl.
CPC ............ *C08B 11/193* (2013.01); *C08L 1/284* (2013.01); *C08L 7/00* (2013.01); *C08L 9/02* (2013.01); *C08L 9/06* (2013.01); *C08L 23/06* (2013.01); *C08L 25/06* (2013.01); *C08L 63/00* (2013.01); *C08L 75/14* (2013.01); *C08L 75/16* (2013.01); *C08L 2205/08* (2013.01); *C08L 2205/16* (2013.01)

(58) Field of Classification Search
CPC .............................. C08B 11/193; C08B 11/20
See application file for complete search history.

(56) References Cited

U.S. PATENT DOCUMENTS

| | | | |
|---|---|---|---|
| 4,228,277 A | 10/1980 | Landoll | |
| 5,488,104 A * | 1/1996 | Schulz | .............. C08B 11/20 536/84 |
| 5,504,123 A | 4/1996 | Partan | |
| 5,698,612 A | 12/1997 | Simon et al. | |
| 5,827,905 A * | 10/1998 | Grigat | .............. C05F 11/00 523/124 |
| 6,372,901 B1 | 4/2002 | Partain, III et al. | |

(Continued)

FOREIGN PATENT DOCUMENTS

| | | |
|---|---|---|
| CN | 100430462 C | 11/2008 |
| FR | 2800378 | 5/2001 |

(Continued)

OTHER PUBLICATIONS

Extended European Search Report for European Application No. 16844315.8, dated Mar. 29, 2019.
International Search Report issued in corresponding International Application No. PCT/JP2016/076057 dated Nov. 15, 2016.
Chinese Office Action and Search Report dated Aug. 12, 2019, for corresponding Chinese Patent Application No. 201680051555.6.
Japanese Office Action, dated Jul. 7, 2020, for Japanese Application No. 2016-173170.
Chinese Office Action and Search Report dated Mar. 19, 2020, for Chinese Application No. 201680051555.6.
Wu et al., "Civil Engineering Materials," 2nd Ed.. Aug. 2008, p. 245 (Total of 3 pages).

(Continued)

*Primary Examiner* — Liam J Heincer
(74) *Attorney, Agent, or Firm* — Birch, Stewart, Kolasch & Birch, LLP

(57) ABSTRACT

Modified cellulose fibers, wherein each of (A) one or more substituents selected from substituents represented by the following general formula (1) and substituents represented by the following general formula (2): —$CH_2$—$CH(OH)$—$R_1$ (1); —$CH_2$—$CH(OH)$—$CH_2$—$(OA)_n$—$O$—$R_1$ (2), wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms, and (B) a substituent represented by the following general formula (3): —$CH_2$—$CH(OH)$—$R_2$ (3), wherein $R_2$ in the general formula (3) is an alkyl group having 1 or more carbon atoms and 2 or less carbon atoms, is independently bonded to cellulose fibers via an ether bond, wherein the modified cellulose fibers have a cellulose I crystal structure. The resin composition blended with the modified cellulose fibers of the present invention can be suitably used in various industrial applications such as daily sundries, household electric appliance parts, wrapping materials for household electric appliance parts and automobile parts.

16 Claims, No Drawings

(56) References Cited

U.S. PATENT DOCUMENTS

| | | | |
|---|---|---|---|
| 6,482,940 B1* | 11/2002 | Klohr | B01J 31/08 536/124 |
| 6,669,863 B1* | 12/2003 | Dijk | C08B 11/193 252/73 |
| 6,703,497 B1 | 3/2004 | Ladouce et al. | |
| 6,790,822 B1 | 9/2004 | Baba et al. | |
| 2001/0018468 A1 | 8/2001 | Karlson | |
| 2005/0139130 A1* | 6/2005 | Partain, III | C04B 24/383 106/730 |
| 2006/0000028 A1* | 1/2006 | Maruyama | D06M 13/11 8/129 |
| 2007/0059267 A1 | 3/2007 | Boström et al. | |
| 2007/0105985 A1* | 5/2007 | Gillette | C08B 11/02 524/34 |
| 2007/0249825 A1* | 10/2007 | Sau | C08B 1/06 536/86 |
| 2009/0221813 A1* | 9/2009 | Moellmann | C08B 1/003 536/85 |
| 2011/0177018 A1* | 7/2011 | Lipic | A61K 8/046 424/70.13 |
| 2011/0230656 A1 | 9/2011 | Maruyama et al. | |
| 2012/0165517 A1* | 6/2012 | Uehira | C08B 13/00 536/65 |
| 2012/0165518 A1 | 6/2012 | Niinobe et al. | |
| 2012/0202926 A1* | 8/2012 | Iji | C08B 3/10 524/41 |
| 2012/0283363 A1 | 11/2012 | Kumamoto et al. | |
| 2012/0328877 A1 | 12/2012 | Shiramizu et al. | |
| 2013/0025920 A1* | 1/2013 | Shimizu | C08J 3/09 174/258 |
| 2014/0073773 A1* | 3/2014 | Miyoshi | C08B 1/08 536/56 |
| 2014/0199250 A1* | 7/2014 | Wang | A61K 8/731 424/59 |
| 2014/0345867 A1* | 11/2014 | Witham | C04B 24/383 166/294 |
| 2015/0098921 A1* | 4/2015 | Franzke | C08B 37/0087 424/70.13 |
| 2015/0239993 A1* | 8/2015 | Miyoshi | A61Q 5/02 132/202 |
| 2016/0102236 A1* | 4/2016 | Alwattari | C04B 28/02 166/278 |
| 2016/0208087 A1 | 7/2016 | Virtanen et al. | |
| 2018/0244806 A1* | 8/2018 | Yoshida | B60C 1/00 |
| 2019/0010253 A1* | 1/2019 | Yoshida | C08B 11/08 |
| 2019/0023859 A1* | 1/2019 | Yoshida | C08L 79/08 |

FOREIGN PATENT DOCUMENTS

| | | |
|---|---|---|
| JP | 2-142814 A | 5/1990 |
| JP | 03-012401 | 1/1991 |
| JP | 3-197535 A | 8/1991 |
| JP | 06-009702 | 1/1994 |
| JP | 08-169901 | 7/1996 |
| JP | 8-231918 A | 9/1996 |
| JP | 9-188779 A | 1/1997 |
| JP | 2002-522569 A | 7/2002 |
| JP | 2002-524618 | 8/2002 |
| JP | 2009-019200 | 1/2009 |
| JP | 2009-261993 | 11/2009 |
| JP | 2010-104768 | 5/2010 |
| JP | 2010-106251 A | 5/2010 |
| JP | 2011-016995 | 1/2011 |
| JP | 2011-140738 | 7/2011 |
| JP | 2011-184816 | 9/2011 |
| JP | 2011-195665 A | 10/2011 |
| JP | 2012-148962 | 8/2012 |
| JP | 2012-237002 A | 12/2012 |
| JP | 2014-218598 A | 11/2014 |
| JP | 2015-52104 A | 3/2015 |
| JP | 2017-052939 | 3/2017 |
| JP | 2017-052940 | 3/2017 |
| JP | 2017-052941 | 3/2017 |
| JP | 2017-053076 | 3/2017 |
| WO | WO 2015/033026 | 3/2015 |

OTHER PUBLICATIONS

"METOLOSE®", Shin-Etsu Chemical Co., Ltd [online], Jul. 15, 2020, 9 pages total, with an English translation, https://www.metolose.jp/industrial/metolose.html (and https://www.metclose.jp/en/industrial/metolose.html).

Japanese Office Action for Japanese Application No. 2016-173172, dated Jul. 14, 2020.

Japanese Office Action dated Apr. 28, 2020, for Japanese Application No. 2016-173168.

* cited by examiner

MODIFIED CELLULOSE FIBERS

FIELD OF THE INVENTION

The present invention relates to modified cellulose fibers. More specifically, the present invention relates to modified cellulose fibers which can be suitably blended as fillers in daily sundries, household electric appliance parts, automobile parts, and the like, a method for producing the modified cellulose fibers, and a resin composition containing the modified cellulose fibers.

BACKGROUND OF THE INVENTION

Conventionally, plastic materials derived from limited resource petroleum have been widely used; however, in the recent years, techniques with less burdens on the environment have been spotlighted. In view of the technical background, materials using cellulose fibers, which are biomass existing in large amounts in nature have been remarked.

For example, Patent Publication 1 discloses cellulose nanofibers characterized in that the cellulose nanofibers have an average degree of polymerization of 600 or more and 30,000 or less, an aspect ratio of from 20 to 10,000, an average diameter of from 1 to 800 nm, and have crystal peaks ascribed to Iβ form in X-ray diffraction patterns, as cellulose nanofibers having excellent reinforcing effect. The resin composition containing the nanofibers shows excellent moldability and coefficient of thermal linear expansion.

Patent Publication 2 discloses cellulose microfibrils having a modified surface, characterized in that a hydroxyl functional group existing on a surface of the microfibrils is etherified with at least one of an organic compound capable of reacting with the hydroxyl functional group, wherein the degree of substitution of surface (DSS) during etherification is at least 0.05. The publication describes that an elastomeric composition containing the microfibrils shows excellent mechanical strength.

Patent Publication 3 discloses a composite material containing cellulose microfibers of which surface is replaced with an ether group having a degree of substitution of surface (DSS) of at least 0.05.

Patent Publication 4 discloses that pulps containing a lignin are subjected to a mechanical defibriation treatment to provide microfibrillated vegetable fibers with a structure coated with hemicellulose and lignin in that order, thereby making them easier to handle in an aqueous system, and that the fiber-reinforced resin blended with the vegetable fibers has a decomposition temperature higher than a conventional microfibrillated cellulose, so that they are excellent in thermal stability.

In addition, as the composite materials of cellulose, the following techniques have been reported. For example, Patent Publication 5 discloses a method for obtaining a modified cellulose fiber dispersion including modifying cellulose before defibriation obtained from wood with an aromatic ring-containing substituent, and then subjecting the cellulose to defibriation to an average fiber size of 100 nm or less, as a cellulose composite material-having excellent transparency, non-coloration, low-linear coefficient of expansion, and high Young's modulus, which is suitably used in the preparation of a cellulose fiber sheet.

Patent Publication 6 discloses a fine cellulose composite in which a surfactant is adsorbed to fine cellulose fibers having a carboxyl group content of from 0.1 to 3 mmol/g as fine cellulose fibers having excellent dispersion stability in an organic solvent.

Patent Publication 7 discloses a method for finely fibrillating cellulose, characterized by adding a polysaccharide to a dispersion medium containing an organic solvent and a modifier unreactive with the organic solvent to finely fibrillate cellulose. Here, the modifier includes acid anhydrides, acid halides, isocyanates, and silane coupling agents.

Patent Publication 8 discloses that nanofibers of cellulose can be produced simply and efficiently and with further reduced damages by swelling and/or partially dissolving a cellulose-based material such as woody pulp with a solvent containing a specified ionic liquid and an organic solvent, thereafter subjecting the liquid mixture to chemical modification or hydrolysis, and subsequently washing the reaction mixture with water or an organic solvent.

Patent Publication 1: Japanese Patent Laid-Open No. 2011-184816
Patent Publication 2: Japanese Unexamined Patent Publication No. 2002-524618
Patent Publication 3: FR2800378 Publication
Patent Publication 4: Japanese Patent Laid-Open No. 2009-19200
Patent Publication 5: Japanese Patent Laid-Open No. 2011-16995
Patent Publication 6: Japanese Patent Laid-Open No. 2011-140738
Patent Publication 7: Japanese Patent Laid-Open No. 2009-261993
Patent Publication 8: Japanese Patent Laid-Open No. 2010-104768

SUMMARY OF THE INVENTION

The present invention relates to the following [1] to [3]:
[1] Modified cellulose fibers, wherein each of
(A) one or more substituents selected from substituents represented by the following general formula (1) and substituents represented by the following general formula (2):

$$-CH_2-CH(OH)-R_1 \qquad (1)$$

$$-CH_2-CH(OH)-CH_2-(OA)_n-O-R_1 \qquad (2)$$

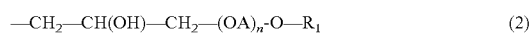

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms, and
(B) a substituent represented by the following general formula (3):

$$-CH_2-CH(OH)-R_2 \qquad (3)$$

wherein $R_2$ in the general formula (3) is an alkyl group having 1 or more carbon atoms and 2 or less carbon atoms, is independently bonded to cellulose fibers via an ether bond, wherein the modified cellulose fibers have a cellulose I crystal structure.
[2] A method for producing modified cellulose fibers, including introducing (b) a nonionic alkylene oxide compound having a total number of carbon atoms of 3 or more and 4 or less per molecule, and (a) one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, concurrently or separately.

[3] A resin composition containing a thermoplastic resin or a curable resin and modified cellulose fibers as defined in the above [1].

DETAILED DESCRIPTION OF THE INVENTION

In the compositions using conventional cellulose composite materials, it is desired to have improvements in heat resistance and strength in the applications to various uses.

The present invention relates to modified cellulose fibers being stably dispersible and capable of exhibiting an excellent thickening effect, when blended with various organic solvents, or being capable of improving mechanical strength, heat resistance, and dimensional stability of the resin composition obtained when blended with various resins, a method for efficiently producing the modified cellulose fibers, and a resin composition containing the modified cellulose fibers.

In addition, the present invention relates to modified cellulose fibers being capable of improving mechanical strength, reduced energy loss, and dimensional stability of the rubber composition obtained when blended with a rubber-based resin, a method for efficiently producing the modified cellulose fibers, and a rubber composition containing the modified cellulose fibers.

The modified cellulose fibers of the present invention show excellent stable dispersion and thickening actions when blended with an organic solvent, and further exhibit some excellent effects that mechanical strength, heat resistance, and dimensional stability of the resin composition obtainable by forming the modified cellulose fibers and a resin into a composite are improved.

In addition, the modified cellulose fibers exhibit excellent effects that mechanical strength, reduced energy loss, and dimensional stability of the rubber composition obtained are improved in a case where the resin is a rubber-based resin.

[Modified Cellulose Fibers]

The modified cellulose fibers of the present invention are characterized in that a specified substituent is bonded to a cellulose fiber surface via an ether bond. The phrase "bonded via an ether bond" as used herein means a state in which a hydroxyl group of the cellulose fiber surface is reacted with a modifying group to form an ether bond.

The reasons why the modified cellulose fibers of the present invention have excellent dispersibility in an organic solvent are assumed to be as follows. Celluloses, in general, are aggregated by hydrogen bonding by the surface hydroxyl groups to form bundles of microfibrils, meanwhile in the modified cellulose fibers of the present invention, the modifying groups are directly ether bonded to the cellulose chain of the cellulose fiber backbone by carrying out a reaction of introducing at least two kinds of specified modifying groups to surface hydroxyl groups, thereby forming hydrophobic cellulose fibers in which a crystal structure of the cellulose is maintained. In addition, since one of the introduced modifying groups has an alkyl group terminal of a specified chain length, a repulsion due to steric hindrance is obtained, and at the same time the other introduced modifying group has an alkyl group terminal shorter than the above modifying group, so that the aggregation due to hydrogen bonding between the cellulose microfibrils is eliminated, thereby making dispersibility in an organic solvent excellent. Therefore, the modified cellulose fibers of the present invention are evenly dispersed in an organic solvent, and their crystal structures are stably maintained, so that the mechanical strength of the resin composition obtained by forming the modified cellulose fibers and the resin into a composite is improved, and also heat resistance and dimensional stability become excellent. However, these assumptions are by no means limiting the present invention.

(Modifying Group)

The modifying group in the modified cellulose fibers of the present invention is (A) one or more substituents selected from a substituent represented by the following general formula (1) and a substituent represented by the following general formula (2):

—CH$_2$—CH(OH)—R$_1$ (1)

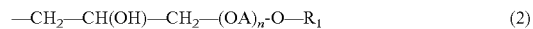

—CH$_2$—CH(OH)—CH$_2$—(OA)$_n$-O—R$_1$ (2)

wherein each R$_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms, and (B) a substituent represented by the following general formula (3);

—CH$_2$—CH(OH)—R$_2$ (3)

wherein R$_2$ in the general formula (3) is an alkyl group having 1 or more carbon atoms and 2 or less carbon atoms; in other words, a group (A) substituents and a group (B) substituents are both bonded and introduced alone or in any combinations thereof. Here, in the group (A) substituents, even if the introduced modifying group were either one of the substituent represented by the formula (1) or the substituent represented by the formula (2), each of substituents, which may be the identical substituent, or a combination of two or more kinds, may be introduced. In the group (A) substituents, each of the substituent represented by the formula (1) and the substituent represented by the formula (2) may be introduced alone or in a combination of two or more kinds.

R$_1$ in the general formula (1) is a linear or branched alkyl group having 3 or more carbon atoms and 30 or less carbon atoms. The number of carbon atoms of the alkyl group is 3 or more and 30 or less, and the number of carbon atoms is preferably 4 or more, more preferably 6 or more, and even more preferably 8 or more, from the viewpoint of mechanical strength, heat resistance, and dimensional stability of the resin composition obtained, and the number of carbon atoms is preferably 25 or less, more preferably 20 or less, even more preferably 18 or less, and still even more preferably 16 or less, from the viewpoint of availability and improvement in reactivity. Specific examples include a propyl group, a butyl group, a pentyl group, a hexyl group, a heptyl group, an octyl group, a nonyl group, a decyl group, an undecyl group, a dodecyl group, a hexadecyl group, an octadecyl group, an icosyl group, a triacontyl group, and the like.

In addition, R$_1$ in the general formula (1), which may depend upon the kind of the organic solvent or the like which is a dispersing agent, has the following preferred ranges, from the viewpoint of thickening action:

In a case of an organic solvent having an SP value of 11 or more and 13 or less: It is preferably 3 or more, and more preferably 4 or more, and preferably 12 or less, and more preferably 10 or less.

In a case of an organic solvent having an SP value of 9.2 or more and less than 11: It is preferably 5 or more, and more preferably 6 or more, and preferably 14 or less, and more preferably 12 or less.

In a case of an organic solvent having an SP value of less than 9.2: It is preferably 8 or more, and more preferably 10 or more, and preferably 20 or less, and more preferably 18 or less.

Here, the organic solvent having an SP value of 11 or more and 13 or less includes dimethylformamide, ethanol, acetonitrile, isopropyl alcohol, and the like; the organic solvent having an SP value of 9.2 or more and less than 11 includes methyl ethyl ketone, acetone, chloroform, dioxane, and the like; and the organic solvent having an SP value of less than 9.2 includes toluene, xylene, ethyl acetate, and the like. In addition, the SP value refers to a solubility parameter (unit: $(cal/cm^3)^{1/2}$), calculated by Fedors method, which is described, for example, in Referential Publication "SP Chi Kiso-Ouyo to Keisan Hoho (*SP Values Basics and Applications and Method of Calculation*)" (JOHOKIKO CO., LTD., 2005); *Polymer Handbook Third Edition* (A Wiley-Interscience Publication, 1989), or the like.

$R_1$ in the general formula (2) is a linear or branched alkyl group having 3 or more carbon atoms and 30 or less carbon atoms. The number of carbon atoms of the alkyl group is 3 or more and 30 or less, and the number of carbon atoms is preferably 4 or more, more preferably 6 or more, and even more preferably 8 or more, from the viewpoint of mechanical strength, heat resistance, and dimensional stability of the resin composition obtained, and the number of carbon atoms is preferably 27 or less, more preferably 22 or less, even more preferably 20 or less, and even more preferably 18 or less, from the viewpoint of availability and improvement in reactivity. Specific examples include the same ones as those of $R_1$ in the general formula (1) mentioned above.

In addition, $R_1$ in the general formula (2), which may depend upon the kind of the organic solvent or the like which is a dispersion medium, has the following preferred ranges, from the viewpoint of thickening action:

In a case of an organic solvent having an SP value of 11 or more and 13 or less: It is preferably 4 or more, and more preferably 6 or more, and preferably 14 or less, more preferably 12 or less, and even more preferably 10 or less.

In a case of an organic solvent having an SP value of 9.2 or more and less than 11: It is preferably 8 or more, and more preferably 10 or more, and preferably 16 or less, and more preferably 14 or less.

In a case of an organic solvent having an SP value of less than 9.2: It is preferably 10 or more, and more preferably 12 or more, and preferably 22 or less, and more preferably 20 or less.

Here, the organic solvent as used herein is as mentioned above.

A in the general formula (2) is a linear or branched, divalent saturated hydrocarbon group having 1 or more carbon atoms and 6 or less carbon atoms, which forms an oxyalkylene group with an adjoining oxygen atom. The number of carbon atoms of A is 1 or more and 6 or less, and the number of carbon atoms is preferably 2 or more, from the viewpoint of availability and costs, and the number of carbon atoms is preferably 4 or less, and more preferably 3 or less, from the same viewpoint. Specific examples include a methylene group, an ethylene group, a propylene group, a butylene group, a pentylene group, a hexylene group, and the like, among which an ethylene group and a propylene group are preferred, and an ethylene group is more preferred.

n in the general formula (2) shows the number of moles of alkylene oxides added. n is a number of 0 or more and 50 or less, and n is preferably 3 or more, more preferably 5 or more, and even more preferably 10 or more, from the viewpoint of availability and costs, and n is preferably 40 or less, more preferably 30 or less, even more preferably 20 or less, and even more preferably 15 or less, from the same viewpoint and from the viewpoint of mechanical strength, heat resistance, and dimensional stability of the resin composition obtained.

The combination of A and n in the general formula (2) is preferably a combination in which A is a linear or branched, divalent saturated hydrocarbon group having 2 or more carbon atoms and 3 or less carbon atoms and n is a number of 0 or more and 20 or less, and more preferably a combination in which A is a linear or branched, divalent saturated hydrocarbon group having 2 or more carbon atoms and 3 or less carbon atoms and n is a number of 5 or more and 15 or less, from the viewpoint of reactivity and thickening effects due to exhibition of steric repulsion.

$R_2$ in the general formula (3) is an alkyl group having 1 or more carbon atoms and 2 or less carbon atoms, and specific examples include a methyl group and an ethyl group.

Specific examples of the substituent represented by the general formula (1) include, for example, a propylhydroxyethyl group, a butylhydroxyethyl group, a pentylhydroxyethyl group, a hexylhydroxyethyl group, a heptylhydroxyethyl group, an octylhydroxyethyl group, a nonylhydroxyethyl group, a decylhydroxyethyl group, an undecylhydroxyethyl group, a dodecylhydroxyethyl group, a hexadecylhydroxyethyl group, an octadecylhydroxyethyl group, an icosylhydroxyethyl group, a triacontylhydroxyethyl group, and the like.

Specific examples of the substituent represented by the general formula (2) include, for example, a 3-hexoxyethylene oxide-2-hydroxy-propyl group, a 3-hexoxy-2-hydroxy-propyl group, a 3-octoxyethylene oxide-2-hydroxy-propyl group, a 3-octoxy-2-hydroxy-propyl group, a 6-ethyl-3-hexoxy-2-hydroxy-propyl group, a 6-ethyl-3-hexoxyethylene oxide-2-hydroxy-propyl group, a 3-decoxyethylene oxide-2-hydroxy-propyl group, a 3-decoxy-2-hydroxy-propyl group, a 3-dodecoxyethylene oxide-2-hydroxy-propyl group, a 3-dodecoxy-2-hydroxy-propyl group, a 3-hexadecoxyethylene oxide-2-hydroxy-propyl group, a 3-hexadecoxy-2-hydroxy-propyl group, a 3-octadecoxyethylene oxide-2-hydroxy-propyl group, a 3-octadecoxy-2-hydroxy-propyl group, and the like. Here, the number of moles of the alkylene oxides added may be 0 or more and 50 or less. For example, the number of moles added in substituents having an oxyalkylene group such as ethylene oxide mentioned above includes substituents of 10, 12, 13, and 20 mol.

Specific examples of the substituent represented by the general formula (3) include, for example, a 2-hydroxy-propyl group, a 2-hydroxy-butyl group, and the like.

(Introduction Ratio)

In the modified cellulose fibers of the present invention, the introduction ratio of the substituent or substituents selected from substituents represented by the above general formula (1) and substituents represented by the above general formula (2), per mol of the anhydrous glucose unit of the cellulose, is preferably 0.001 mol or more, more preferably 0.005 mol or more, even more preferably 0.01 mol or more, even more preferably 0.05 mol or more, even more preferably 0.1 mol or more, even more preferably 0.2 mol or more, and even more preferably 0.3 mol or more, from the viewpoint of affinity to the solvent. In addition, the introduction ratio is preferably 1.5 mol or less, more preferably 1.3 mol or less, even more preferably 1.0 mol or less, even more preferably 0.8 mol or less, even more preferably 0.6 mol or less, and even more preferably 0.5 mol or less, from the viewpoint of having cellulose I crystal structure and exhibiting strength. Here, when both of the substituent represented by the general formula (1) and the substituent represented by the general formula (2) are introduced, the introduction ratio refers to a total introduction molar ratio. In addition, in the modified cellulose fibers of the present invention, the introduction ratio of the substituent represented by the above general formula (3), per mol of the anhydrous glucose unit of the cellulose, is preferably 1.5 mol or less, more preferably 1.0 mol or less, and even more preferably 0.8 mol or less, and preferably 0.01 mol or more, more preferably 0.02 mol or more, and even more preferably 0.04 mol or more, from the viewpoint of having cellulose I crystal structure and exhibiting strength. The introduction ratio as used herein can be measured in accordance with the method described in Examples set forth below, which may be also described as an introduction molar ratio or modification ratio.

(Average Fiber Size)

The modified cellulose fibers of the present invention are not particularly limited in the average fiber size regardless of the kinds of the substituents. Embodiments include, for example, an embodiment where the average fiber size is in micro-order (an embodiment 1) and an embodiment where the average fiber size is in nano-order (an embodiment 2).

The modified cellulose fibers of the embodiment 1 have an average fiber size of preferably 5 µm or more, more preferably 7 µm or more, and even more preferably 10 µm or more, from the viewpoint of handling property, availability and costs. In addition, the upper limit is, but not particularly set, preferably 100 µm or less, more preferably 70 µm or less, even more preferably 50 µm or less, even more preferably 40 µm or less, and even more preferably 30 µm or less, from the viewpoint of handling property. The average fiber size of the modified cellulose fibers in the micro-order as used herein can be measured in accordance with the following method.

Specific examples include, for example, a method including stirring cellulose fibers which were absolutely dried with a household mixer or the like in ion-exchanged water to defibrillate, and further adding ion-exchange water thereto while stirring to make an even aqueous dispersion, and analyzing a part of the aqueous dispersion obtained by "Kajaani Fiber Lab" manufactured by Metso Automation. According to the above method, the average fiber size can be measured as the fiber sizes in the micro-order. Incidentally, the detailed measurement method is as described in Examples.

The modified cellulose fibers of the embodiment 2 have an average fiber size of preferably 1 nm or more, more preferably 3 nm or more, even more preferably 10 nm or more, and even more preferably 20 nm or more, from the viewpoint of improved heat resistance, handling property, availability, and costs, and preferably 500 nm or less, more preferably 300 nm or less, even more preferably 200 nm or less, even more preferably 150 nm or less, and still even more preferably 120 nm or less, from the viewpoint of handling property, dimensional stability, dispersibility in a solvent, and exhibition of thickening property. Here, the average fiber size of the modified cellulose fibers in the nano-order as used herein can be measured in accordance with the following method.

Specifically, a fiber size in a nano-order can be measured by observing a dispersion obtained by a finely fibrillating treatment with an optical microscope manufactured by KEYENCE, "Digital Microscope VHX-1000" at a magnification of from 300 to 1,000 folds, and calculating an average of 30 or more of fiber strands. In a case where an observation with an optical microscope is difficult, a dispersion prepared by further adding a solvent to the above dispersion is dropped on mica and dried to provide an observation sample, and a measurement can be taken with an interatomic force microscope (AFM), Nanoscope III Tapping mode AFM, manufactured by Digital Instrument, using probe Point Probe (NCH) manufactured by NANOSENSORS. Generally, a minimum unit of cellulose nanofibers prepared from higher plants is packed in nearly square form having sizes of 6×6 molecular chains, so that the height analyzed in the image according to the AFM can be assumed to be a width of the fibers. Here, the detailed method for measurement is as described in Examples.

(Crystallinity)

The crystallinity of the modified cellulose fibers is preferably 10% or more, more preferably 15% or more, and even more preferably 20% or more, from the viewpoint of exhibiting strength. Also, the crystallinity is preferably 90% or less, more preferably 85% or less, even more preferably 80% or less, and even more preferably 75% or less, from the viewpoint of availability of the raw materials. Here, the crystallinity of the cellulose as used herein refers to a cellulose I crystallinity which is calculated from diffraction intensity values according to X-ray diffraction method, which can be measured by the method described in Examples set forth below. Here, the cellulose I refers to a crystal form of natural cellulose, and the cellulose I crystallinity means a proportion of the amount of crystalline region that occupies the entire cellulose.

(Viscosity)

Since the modified cellulose fibers have excellent dispersibility in an organic solvent by introducing substituents as defined above, while having a fine fiber size mentioned above, in the modified cellulose fibers of the embodiment 2 out of the modified cellulose fibers of the present invention, the thickening property inherently owned by the cellulose fibers can be more effectively exhibited. In the present invention, as an index for evaluating the thickening property, a viscosity of a dispersion at a concentration of 0.2% by mass prepared by subjecting the dispersion to a finely dispersing treatment 10 times at a pressure of 100 MPa with a high-pressure homogenizer such as a high-pressure, wet type media-less finely fibrillating apparatus, for example, NanoVater L-ES manufactured by YOSHIDA KIKAI CO., LTD. in any one of the organic solvents selected from dimethylformnamide, methyl ethyl ketone, and toluene is used. Here, as the viscosity, a value measured with an E-type viscometer, cone rotor: 1° 34'×R24, under conditions of 25° C. and 1 rpm, is adopted. The viscosity of the modified cellulose fibers of the present invention measured under the above conditions in any one of the solvents mentioned above is preferably 15 mPa·s or more, more preferably 20 mPa·s or more, even more preferably 30 mPa·s or more, even more preferably 50 mPa·s or more, still even more preferably 100 mPa·s or more, and still even more preferably 150 mPa·s or more in any one of the above organic solvents, from the viewpoint of exhibition of strength, and the viscosity is preferably 10,000 mPa·s or less, more preferably 8,000 mPa·s or less, and even more preferably 5,000 mPa·s or less, from the viewpoint of availability of raw materials. Here, when a viscosity is measured in accordance with the above conditions, it is embraced by the present invention so long as a viscosity in at least one of the above organic solvents is 15 mPa·s or more. In other words, even if the viscosity in one organic solvent is less than 15 mPa·s, the modified cellulose fibers can be evaluated as having thickening property in the present invention so long as the viscosity in another organic solvent is 15 mPa·s or more. Accordingly, the modified cellulose fibers of which viscosities in all the above organic solvents are less than 15 mPa·s cannot be evaluated as having thickening property in the present invention.

[Method for Producing Modified Cellulose Fibers]

In the modified cellulose fibers of the present invention, the above substituents are bonded to the surface of the cellulose fibers via an ether bond as mentioned above, and the introduction of the substituents can be carried out in accordance with a known method without particular limitations. Specific examples include a method including introducing (b) a nonionic alkylene oxide compound having a total number of carbon atoms of 3 or more and 4 or less per molecule, and (a) one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, concurrently or separately. Here, the introduction of a compound (a) and a compound (b) is carried out "concurrently or separately" refers to that the order of introduction of a compound (a) and a compound (b) in the present invention is not particularly limited, meaning that a compound (a) and a compound (b) may be concurrently introduced, or a compound (a) may be introduced first, and a compound (b) is then introduced, or a compound (b) may be introduced first, and a compound (a) is then introduced. Hereinafter, an embodiment where a compound (a) is introduced first, and a compound (b) is then introduced is referred to as an embodiment I; an embodiment where a compound (b) is introduced first, and a compound (a) is then introduced is referred to as an embodiment II; and an embodiment where a compound (a) and a compound (b) are concurrently introduced is referred to as an embodiment III. Among them, the embodiment II and the embodiment III are preferred, and the embodiment 11 is more preferred, from the viewpoint of dispersibility and thickening ability, and from the viewpoint of heat resistance and dimensional stability. Explanations will be given hereinbelow by taking an embodiment II as an example.

The method of the embodiment II includes specifically the method including the following steps I-1 and II-2:

step II-1) introducing (b) a nonionic alkylene oxide compound having a total number of carbon atoms of 3 or more and 4 or less per molecule to a cellulose-based raw material via an ether bond, in the presence of a base, and step II-2) introducing (a) one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to cellulose fibers obtained in the step II-1 via an ether bond, in the presence of the base.

In the step II-1, the cellulose-based raw material may be subjected to an ether reaction with a compound having a substituent represented by the general formula (3) defined above in the presence of a base as a compound (b).

(Cellulose-Based Raw Material)

The cellulose-based raw material usable in the present invention includes, but not particularly limited to, woody raw materials (needle-leaf trees and broad-leaf trees); grassy raw materials (plant raw materials of Gramineae, Malvaceae, and Fabaceae, non-woody raw materials of plants of Palmae); pulps (cotton linter pulps obtained from fibers surrounding the cottonseeds, etc.); and papers (newspapers, corrugated cardboards, magazines, high-quality paper, etc.). Among them, woody and grassy raw materials are preferred, from the viewpoint of availability and costs.

The shape of the cellulose-based raw material is, but not particularly limited to, preferably fibrous, powdery, spherical, chip-like, or flaky, from the viewpoint of handling property. Also, it may be a mixture of these shapes.

In addition, the cellulose-based raw material can be previously subjected to at least one pretreatment selected from biochemical treatment, chemical treatment, and mechanical treatment, from the viewpoint of handing property and the like. In the biochemical treatment, the chemical used is not particularly limited, and the biochemical treatment includes, for example, a treatment using an enzyme such as endoglucanase, exoglucanase, or beta-glucosidase. In the chemical treatment, the chemical used is not particularly limited, and the chemical treatment includes, for example, an acid treatment with hydrochloric acid, sulfuric acid, or the like, and an oxidation treatment with hydrogen peroxide, ozone, or the like. In the mechanical treatment, the machines used and the treatment conditions are not particularly limited, and examples include roll mills such as high-pressure compression roll mills and roll-rotating mills, vertical roller mills such as ring roller mills, roller race mills or ball race mills, vessel driving medium mills such as tumbling ball mills, vibrating ball mills, vibrating rod mills, vibrating tube mills, planetary ball mills, or centrifugal fluidized bed mills, media agitating mills such as tower pulverizers, agitation tank-containing mills, flow tank-containing mills or annular mills, compact shearing mills such as high-speed centrifugal roller mills or angmills, mortar, millstone, Masscolloider, fret mills, edge-runner mills, knife mills, pin mills, cutter mills, and the like.

In addition, during the above mechanical treatment, the shape transformation by mechanical treatment can also be accelerated by adding an aid such as a solvent such as water, ethanol, isopropyl alcohol, t-butyl alcohol, toluene, or xylene, a plasticizer such as a phthalic acid compound, an adipic acid compound, or a trimellitic acid compound, a hydrogen bonding-inhibitor such as urea, an alkali (alkaline earth) metal hydroxide, or an amine-based compound. By adding the shape transformation as described above, the handling property of the cellulose-based raw materials is improved, which makes the introduction of a substituent favorable, which in turn makes it possible to also improve the physical properties of the modified cellulose fibers obtained. The amount of the additive aid used varies depending upon the additive aid used, a means of the mechanical treatment used or the like, and the amount used, based on 100 parts by mass of the raw material is usually 5 parts by mass or more, preferably 10 parts by mass or more, and more preferably 20 parts by mass or more, from the viewpoint of exhibiting the effects of accelerating the shape transformation, and the amount used is usually 10,000 parts by mass or less, preferably 5,000 parts by mass or less, and more preferably 3,000 parts by mass or less, from the viewpoint of exhibiting the effects of accelerating the shape transformation and from the viewpoint of economic advantages.

The average fiber size of the cellulose-based raw material is, but not particularly limited to, preferably 5 μm or more, more preferably 7 μm or more, even more preferably 10 μm or more, and even more preferably 15 m or more, from the viewpoint of handling property and costs. In addition, the upper limit is, but not particularly set, preferably 10,000 μm or less, more preferably 5,000 μm or less, even more preferably 1,000 μm or less, even more preferably 500 μm or less, and still even more preferably 100 μm or less, from the viewpoint of handling property.

In addition, the cellulose-based raw material which is previously finely fibrillated may be used, from the viewpoint of reduction in production steps, and the average fiber size in that case is preferably 1 nm or more, more preferably 2 nm or more, even more preferably 3 nm or more, and even more preferably 10 nm or more, from the viewpoint of improved heat resistance. In addition, the upper limit is, but not particularly set to, preferably 500 nm or less, more preferably 300 nm or less, even more preferably 200 nm or less, even more preferably 100 nm or less, and still even more preferably 80 nm or less, from the viewpoint of handling property.

The average fiber size of the cellulose-based raw material can be measured in the same manner as in the modified cellulose fibers mentioned above. The detailed measurement method is as described in Examples.

The composition of the cellulose-based raw material is not particularly limited. It is preferable that the cellulose content in the cellulose-based raw material is preferably 30% by mass or more, more preferably 50% by mass or more, and even more preferably 70% by mass or more, from the viewpoint of obtaining cellulose fibers, and the cellulose content is preferably 99% by mass or less, more preferably 98% by mass or less, even more preferably 95% by mass or less, and even more preferably 90% by mass or less, from the viewpoint of availability. Here, the cellulose content in the cellulose-based raw material refers to a cellulose content in the remainder component after removing water in the cellulose-based raw material.

In addition, the water content in the cellulose-based raw material is, but not particularly limited to, preferably 0.01% by mass or more, more preferably 0.1% by mass or more, even more preferably 0.5% by mass or more, even more preferably 1.0% by mass or more, even more preferably 1.5% by mass or more, and even more preferably 2.0% by mass or more, from the viewpoint of availability and costs, and the water content is preferably 50% by mass or less, more preferably 40% by mass or less, even more preferably 30% by mass or less, and even more preferably 20% by mass or less, from the viewpoint of handling property.

(Base)

In the step II-1, the above cellulose-based raw material is mixed with a base.

The base usable in the step II-1 is, but not particularly limited to, preferably one or more members selected from the group consisting of alkali metal hydroxides, alkaline earth metal hydroxides, primary to tertiary amines, quaternary ammonium salts, imidazoles and derivatives thereof, pyridine and derivatives thereof, and alkoxides, from the viewpoint of progressing etherification reaction.

The alkali metal hydroxide and the alkaline earth metal hydroxide include sodium hydroxide, potassium hydroxide, lithium hydroxide, calcium hydroxide, barium hydroxide, and the like.

The primary to tertiary amines refer to primary amines, secondary amines, and tertiary amines, and specific examples include ethylenediamine, diethylamine, proline, N,N,N',N'-tetramethylethylenediamine, N,N,N',N'-tetramethyl-1,3-propanediamine, N,N,N',N'-tetramethyl-1,6-hexanediamine, tris(3-dimethylaminopropyl)amine, N,N-dimethylcyclohexylamine, triethylamine, and the like.

The quaternary ammonium salt includes tetrabutylammonium hydroxide, tetrabutylammonium chloride, tetrabutylammonium fluoride, tetrabutylammonium bromide, tetraethylammonium hydroxide, tetraethylammonium chloride, tetraethylammonium fluoride, tetraethylammonium bromide, tetramethylammonium hydroxide, tetramethylammonium chloride, tetramethylammonium fluoride, tetramethylammonium bromide, and the like.

The imidazole and derivatives thereof include 1-methylimidazole, 3-aminopropylimidazole, carbonyldiimidazole, and the like.

The pyridine and derivatives thereof include N,N-dimethyl-4-aminopyridine, picoline, and the like.

The alkoxide includes sodium methoxide, sodium ethoxide, potassium t-butoxide, and the like.

The amount of the base, based on the anhydrous glucose unit of the cellulose-based raw material, is preferably 0.01 equivalents or more, more preferably 0.05 equivalents or more, even more preferably 0.1 equivalents or more, and even more preferably 0.2 equivalents or more, from the viewpoint of progressing the etherification reaction, and the amount of the base is preferably 10 equivalents or less, more preferably 8 equivalents or less, even more preferably 5 equivalents or less, and even more preferably 3 equivalents or less, from the viewpoint of production costs.

Here, the mixing of the above cellulose-based raw material and the base may be carried out in the presence of a solvent. The solvent includes, but not particularly limited to, for example, water, isopropanol, t-butanol, dimethylformamide, toluene, methyl isobutyl ketone, acetonitrile, dimethyl sulfoxide, dimethylacetamide, 1,3-dimethyl-2-imidazolidinone, hexane, 1,4-dioxane, and mixtures thereof.

The mixing of the cellulose-based raw material and the base is not limited in the temperature and time, so long as the components can be homogeneously mixed.

(Compound Having Substituent, Compound (b))

Next, a mixture of the cellulose-based raw material and the base obtained above is reacted with a compound having a substituent represented by the general formula (3) defined above. The compound is not particularly limited, so long as the compound is capable of bonding the above substituent during the reaction with the cellulose-based raw material, and in the present invention, it is preferable to use a compound having a cyclic structure group having reactivity, from the viewpoint of reactivity and a non-halogen-containing compound, and a compound having an epoxy group is preferably used.

As the compound having a substituent represented by the general formula (3), for example, a nonionic alkylene oxide compound represented by the following general formula (3A) is preferred. The compound may be one prepared by a known technique, or a commercially available product may be used. A total number of carbon atoms of the compound is 3 or more and 4 or less, from the viewpoint of mechanical strength, dimensional stability and heat resistance.

As the compound having a substituent represented by the general formula (3), for example, a nonionic alkylene oxide compound represented by the following general formula (3A):

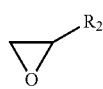

(3A)

wherein $R_2$ is an alkyl group having 1 or more carbon atoms and 2 or less carbon atoms, is preferred.

R₂ in the general formula (3A) is an alkyl group having 1 or more carbon atoms and 2 or less carbon atoms, which is a methyl group or an ethyl group.

Specific examples of the compound represented by the general formula (3A) include 1,2-epoxypropane and 1,2-epoxybutane.

The amount of the above compound can be determined by a desired introduction ratio of the substituent represented by the general formula (3) defined above in the cellulose fibers obtained, and the amount of the compound, based on the anhydrous glucose unit of the cellulose-based raw material, may be preferably 5.0 equivalents or less, and the lower limit is 0.02 equivalents or so, from the viewpoint of mechanical strength and exhibition of thickening property of the resin composition obtained.

(Ether Reaction)

The ether reaction of the above compound and the cellulose-based raw material can be carried out by mixing both the components in the presence of a solvent. The solvent is not particularly limited, and solvents which are exemplified as being usable in the presence of the above base can be used.

The amount of the solvent used is not unconditionally determined because the amount depends upon the kinds of the cellulose-based raw material and the above compound having substituents, and the amount used, based on 100 parts by mass of the cellulose-based raw material, is preferably 30 parts by mass or more, more preferably 50 parts by mass or more, even more preferably 75 parts by mass or more, even more preferably 100 parts by mass or more, and even more preferably 200 parts by mass or more, from the viewpoint of reactivity, and the amount used is preferably 10,000 parts by mass or less, more preferably 5,000 parts by mass or less, even more preferably 2,500 parts by mass or less, even more preferably 1,000 parts by mass or less, and even more preferably 500 parts by mass or less, from the viewpoint of productivity.

The mixing conditions are not particularly limited so long as the cellulose-based raw material and the above compound having substituents are homogeneously mixed, so that the reaction can be sufficiently progressed, and continuous mixing treatment may or may not be carried out. In a case where a relatively large reaction vessel having a size exceeding 1 L is used, stirring may be appropriately carried out from the viewpoint of controlling the reaction temperature.

The reaction temperature is not unconditionally determined because the reaction temperature depends upon the kinds of the cellulose-based raw material and the above compound having substituents and an intended introduction ratio, and the reaction temperature is preferably 30° C. or higher, more preferably 35° C. or higher, and even more preferably 40° C. or higher, from the viewpoint of improving reactivity, and the reaction temperature is preferably 120° C. or lower, more preferably 110° C. or lower, even more preferably 100° C. or lower, even more preferably 90° C. or lower, even more preferably 80° C. or lower, and even more preferably 70° C. or lower, from the viewpoint of inhibiting pyrolysis.

The reaction time is not unconditionally determined because the reaction time depends upon the kinds of the cellulose-based raw material and the above compound having a substituent and an intended introduction ratio, and the reaction time is preferably 3 hours or more, more preferably 6 hours or more, and even more preferably 10 hours or more, from the viewpoint of reactivity, and the reaction time is preferably 60 hours or less, more preferably 48 hours or less, and even more preferably 36 hours or less, from the viewpoint of productivity.

After the reaction, a post-treatment can be appropriately carried out in order to remove an unreacted compound, an unreacted base, or the like. As the method for post-treatment, for example, an unreacted base can be neutralized with an acid (an organic acid, an inorganic acid, etc.), and thereafter washed with a solvent that dissolves the unreacted compound or base. As desired, drying (vacuum drying etc.) may be further carried out.

Thus, the cellulose fibers into which the substituent represented by the general formula (3) is introduced are obtained.

Next, in the step II-2, the cellulose fibers obtained in the step II-1 may be subjected to an ether reaction with one or more members selected from compounds having a substituent represented by the above general formula (1) and compounds having a substituent represented by the above general formula (2) as the compound (a) in the presence of a base.

In the step II-2, first, the cellulose fibers obtained in the step II-1 are mixed with a base. As to the base usable in the step II-2, the kinds and amounts thereof can be similarly set as in the step II-1. In addition, the mixing of those components is not particularly limited in temperature or time, so long as the components can be homogeneously mixed.

(Compound Having Substituent, Compound (a))

Next, a mixture of the cellulose fibers and the base obtained above is reacted with one or more compounds selected from a compound having a substituent represented by the general formula (1) and a compound having a substituent represented by the general formula (2) defined above as a compound having a substituent. The compound is not particularly limited, so long as the compound is capable of bonding the above substituent during the reaction with the cellulose fibers obtained in the step 1, and in the present invention, it is preferable to use a compound having a cyclic structure group having reactivity, from the viewpoint of reactivity and a non-halogen-containing compound, and a compound having an epoxy group is preferably used. Each of the compounds will be exemplified hereinbelow.

As the compound having a substituent represented by the general formula (1), for example, a nonionic alkylene oxide compound represented by the following general formula (1A):

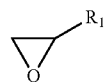

(1A)

wherein $R_1$ is a linear or branched alkyl group having 3 or more carbon atoms and 30 or less carbon atoms, is preferred. The compound may be one prepared by a known technique, or a commercially available product may be used. A total number of carbon atoms of the compound is 5 or more, preferably 6 or more, and more preferably 8 or more, from the viewpoint of mechanical strength, heat resistance, and dimensional stability of the resin composition obtained, and a total number of carbon atoms is 32 or less, preferably 22 or less, more preferably 18 or less, even more preferably 14 or less, and even more preferably 12 or less, from the viewpoint of mechanical strength, heat resistance, and dimensional stability of the resin composition obtained.

$R_1$ in the general formula (1A) is a linear or branched alkyl group having 3 or more carbon atoms and 30 or less carbon atoms. The number of carbon atoms of the alkyl group is 3 or more and 30 or less, and the number of carbon atoms is preferably 4 or more, and more preferably 6 or more, from the viewpoint of mechanical strength, heat resistance, and dimensional stability of the resin composition obtained, and the number of carbon atoms is preferably 20 or less, more preferably 16 or less, even more preferably 12 or less, and even more preferably 10 or less, from the viewpoint of mechanical strength, heat resistance, and dimensional stability of the resin composition obtained. Specific examples include those listed in the section of $R_1$ in the substituent represented by the general formula (1).

Specific examples of the compound represented by the general formula (1A) include 1,2-epoxyhexane, 1,2-epoxydecane, and 1,2-epoxyoctadecane.

The compound having a substituent represented by the general formula (2) is, for example, preferably a nonionic glycidyl ether compound represented by the following general formula (2A):

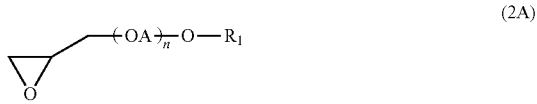

(2A)

wherein $R_1$ is a linear or branched alkyl group having 3 or more carbon atoms and 30 or less carbon atoms; A is a linear or branched, divalent saturated hydrocarbon group having 1 or more carbon atoms and 6 or less carbon atoms; and n is a number of 0 or more and 50 or less. The compound may be one prepared by a known technique, or a commercially available product may be used. A total number of carbon atoms of the compound is 5 or more, preferably 6 or more, more preferably 10 or more, and even more preferably 20 or more, from the viewpoint of mechanical strength, heat resistance, and dimensional stability of the resin composition obtained, and a total number of carbon atoms is 100 or less, preferably 75 or less, more preferably 50 or less, and even more preferably 25 or less, from the viewpoint of mechanical strength, heat resistance, and dimensional stability of the resin composition obtained.

$R_1$ in the general formula (2A) is a linear or branched alkyl group having 3 or more carbon atoms and 30 or less carbon atoms. The number of carbon atoms of the alkyl group is 3 or more and 30 or less, and the number of carbon atoms is preferably 4 or more, and more preferably 6 or more, from the viewpoint of mechanical strength, heat resistance, and dimensional stability of the resin composition obtained, and the number of carbon atoms is preferably 20 or less, more preferably 16 or less, and even more preferably 12 or less, from the viewpoint of mechanical strength, heat resistance, and dimensional stability of the resin composition obtained. Specific examples include those listed in the section of $R_1$ in the substituent represented by the general formula (2).

A in the general formula (2A) is a linear or branched, divalent saturated hydrocarbon group having 1 or more carbon atoms and 6 or less carbon atoms, which forms an oxyalkylene group with an adjoining oxygen atom. The number of carbon atoms of A is 1 or more and 6 or less, and the number of carbon atoms is preferably 2 or more, from the viewpoint of availability and costs, and the number of carbon atoms is preferably 4 or less, and more preferably 3 or less, from the same viewpoint. Specific examples include those listed in the section of A in the substituent represented by the general formula (2), among which an ethylene group and a propylene group are preferred, and an ethylene group is more preferred.

n in the general formula (2A) is the number of moles of alkylene oxides added. n is a number of 0 or more and 50 or less, and n is preferably 3 or more, more preferably 5 or more, and even more preferably 10 or more, from the viewpoint of availability and costs, and n is preferably 40 or less, more preferably 30 or less, even more preferably 20 or less, and even more preferably 15 or less, from the same viewpoint and from the viewpoint of affinity with a low-polarity solvent.

Specific examples of the compound represented by the general formula (2A) include butyl glycidyl ether, 2-ethylhexyl glycidyl ether, dodecyl glycidyl ether, stearyl glycidyl ether, and polyoxyalkylene alkyl ethers.

The amount of the above compound can be determined by a desired introduction ratio of the substituent represented by the general formula (1) and/or the substituent represented by the general formula (2) in the modified cellulose fibers obtained, and the amount of the compound, based on the anhydrous glucose unit of the cellulose-based raw material, is preferably 0.01 equivalents or more, more preferably 0.1 equivalents or more, even more preferably 0.3 equivalents or more, even more preferably 0.5 equivalents or more, and still even more preferably 1.0 equivalent or more, from the viewpoint of reactivity, and the amount is preferably 10 equivalents or less, more preferably 8 equivalents or less, even more preferably 6.5 equivalents or less, and even more preferably 5 equivalents or less, from the viewpoint of production costs.

(Ether Reaction)

The ether reaction of the above compound and the cellulose fibers obtained in the step II-1 can be carried out by mixing both the components in the presence of a solvent in the same manner as in the step II-1. As to the kinds of the solvents used, the amount used, and the mixing conditions, the reference can be made to the step 1.

The reaction temperature is not unconditionally determined because the reaction temperature depends upon the kinds of the cellulose fibers obtained in the step II-1 and the above compound having a substituent and an intended introduction ratio, and the reaction temperature is preferably 40° C. or higher, more preferably 50° C. or higher, and even more preferably 60° C. or higher, from the viewpoint of improving reactivity, and the reaction temperature is preferably 120° C. or lower, more preferably 110° C. or lower, and even more preferably 100° C. or lower, from the viewpoint of inhibiting pyrolysis.

The reaction time is not unconditionally determined because the reaction time depends upon the kinds of the cellulose fibers obtained in the step II-1 and the above compound having a substituent and an intended introduction ratio, and the reaction time is preferably 3 hours or more, more preferably 6 hours or more, and even more preferably 10 hours or more, from the viewpoint of reactivity, and the reaction time is preferably 60 hours or less, more preferably 48 hours or less, and even more preferably 36 hours or less, from the viewpoint of productivity.

Thus, in the embodiment II, the compound (b) can be first introduced, and the compound (a) can then be introduced. On the other hand, in the embodiment I, the compound (a)

is first introduced, and the compound (b) is then introduced, and specifically the order of the step II-1 and the step II-2 in the embodiment II may be carried out in reversal. Specifically, in the step I-1, a compound having a substituent represented by the general formula (1) and/or a compound having a substituent represented by the general formula (2) defined above, a compound (a), is first reacted with a cellulose-based raw material referring to the step II-2, and subsequently in the step I-2, a compound having a substituent represented by the general formula (3) defined above, a compound (b), is reacted with the cellulose fibers obtained referring to the step II-1. In addition, in the embodiment III, the compound (a) and the compound (b) are introduced, and a compound having a substituent represented by the general formula (1) and/or a compound having a substituent represented by the general formula (2) defined above, and a compound having a substituent represented by the general formula (3) defined above may be reacted with a cellulose-based raw material in the same reaction system.

In addition, after the above reaction, for example, the modified cellulose fibers of the present invention may be subjected to the same treatment as the pretreatment which is carried out to the cellulose-based raw material for the reaction mixture to form into chips, flaky, and powdery shapes. By having the shape transformation by the treatment, when the modified cellulose fibers of the present invention obtained are added to the resin composition, the physical properties such as Young's modulus of the resin composition can be improved.

Furthermore, the modified cellulose fibers of the present invention may be subjected to a known finely fibrillating treatment after the above reaction, to be finely fibrillated. For example, the modified cellulose fibers can be finely fibrillated by carrying out a treatment with a high-pressure homogenizer or the like in an organic solvent. In addition, the fine modified cellulose fibers can be obtained by carrying out an introduction reaction of the above substituent with a cellulose-based raw material which is previously subjected to a finely fibrillating treatment, and it is preferable that fine fibrillation is carried out by a known finely fibrillating treatment after the reaction of introduction of the above substituent, from the viewpoint of mechanical strength, heat resistance, and dimensional stability.

Specifically, for example, in a case where modified cellulose fibers having an average fiber size of 5 μm or more are obtained, a mechanical treatment can be carried out with a vessel driving medium mill, a media agitating mill or the like. Alternatively, in a case where modified cellulose fibers having an average fiber size of 1 nm or more and 500 nm or less are obtained, a treatment with a high-pressure homogenizer or the like in an organic solvent can be carried out.

After the reaction, a post-treatment can be appropriately carried out in order to remove an unreacted compound, an unreacted base, or the like. As the method for post-treatment, for example, an unreacted base can be neutralized with an acid (an organic acid, an inorganic acid, etc.), and thereafter washed with a solvent that dissolves the unreacted compound or base. As desired, drying (vacuum drying etc.) may be further carried out.

Thus, the modified cellulose fibers of the present invention are obtained.

The modified cellulose fibers obtained are in a state that the substituent represented by the general formula (1) and/or the substituent represented by the general formula (2), and the substituent represented by the general formula (3) are ether-bonded on the cellulose fiber surface. Specific examples include, for example, modified cellulose fibers represented by the following general formula (4):

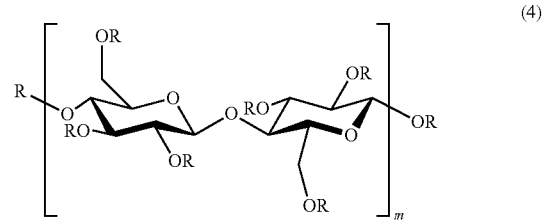

wherein R, which may be identical or different, is hydrogen, or (A) a substituent selected from substituents represented by the general formula (1) defined above and substituents represented by the general formula (2) defined above, or (b) a substituent represented by the general formula (3) defined above; and m is an integer of 20 or more and 3,000 or less, with proviso that a case where all R's are simultaneously hydrogens, a case where all are simultaneously substituents (A), and a case where all are simultaneously substituents (B) are excluded.

In the modified cellulose fibers represented by the general formula (4), R, which may be identical or different, is hydrogen, or (A) a substituent selected from substituents represented by the general formula (1) defined above and substituents represented by the general formula (2) defined above, or (B) a substituent represented by the general formula (3) defined above, which has a repeating structure of cellulose unit into which the above substituent is introduced. As the number of repeats of the repeating structure, m in the general formula (4) may be an integer of 20 or more and 3,000 or less, and m is preferably 100 or more and 2,000 or less, from the viewpoint of mechanical strength, heat resistance, and dimensional stability.

[Resin Composition]

Since the modified cellulose fibers of the present invention have excellent dispersibility in an organic solvent, the modified cellulose fibers can be mixed with a known resin to provide a resin composition. Therefore, the present invention also provide a resin composition containing a thermoplastic resin or curable resin and the modified cellulose fibers of the present invention. The resin composition obtained can be worked in accordance with the properties of the resins to be mixed, and it is assumed that by blending the modified cellulose fibers of the present invention, one of the introduced modifying group has an alkyl group terminal of a specified length, a repulsion due to steric hindrance is obtained, and at the same time the other introduced modifying group has a shorter alkyl group terminal than the above modifying group, so that the aggregation due to hydrogen bonding between the cellulose microfibrils is eliminated, thereby making dispersibility in a resin excellent. Also, the modified cellulose fibers still maintain their crystal structures, so that the mechanical strength is excellent, and also heat resistance and dimensional stability can be improved. Explanations will be given hereinbelow in sections of the kinds of the resins to be mixed.

Embodiment A

As the resin in the resin composition of the embodiment A, a thermoplastic resin or a curable resin can be used.

The thermoplastic resin includes saturated polyester-based resins such as polylactic acid resins; olefinic resins such as polyethylene-based resins, polypropylene-based resins, and ABS resins; cellulose-based resins such as triacetylated cellulose and diacetylated cellulose; nylon resins; vinyl chloride resins; styrene resins; vinyl ether resins; polyvinyl alcohol resins; polyamide-based resins; polycarbonate-based resins; polysulfonate-based resins, and the like. The curable resin is preferably a photo-curable resin and/or a thermosetting resin. Specific examples include epoxy resins, (meth)acrylic resins, phenolic resins, unsaturated polyester resins, polyurethane resins, or polyimide resins. These resins may be used alone or as a mixed resin of two or more kinds. Here, the term (meth)acrylic resin as used herein means to embrace methacrylic resins and acrylic resins.

The resin can be subjected to photo-cure treatment and/or heat-cure treatment, depending upon the kinds of the resins.

In the photo-curable treatment, the polymerization reaction is allowed to progress using a photopolymerization initiator which generates a radical or a cation by active energy ray irradiation of ultraviolet rays, electron beams or the like.

The above photopolymerization initiator includes, for example, acetophenones, benzophenones, ketals, anthraquinones, thioxanthones, azo compounds, peroxides, 2,3-dialkylthione compounds, disulfide compounds, thiuram compounds, fluoroamine compounds, and the like. More specific examples include 1-hydroxy-cyclohexyl-phenyl-ketone, 2-methyl-1[4-(methylthio)phenyl]-2-morpholinopropan-1-one, benzyl methyl ketone, 1-(4-dodecylphenyl)-2-hydroxy-2-methylpropan-1-one, 1-(4-isopropylphenyl)-2-hydroxy-2-hydroxy-2-methylpropan-1-one, benzophenone, and the like.

With the photopolymerization initiator, for example, a monomer (monofunctional monomer and/or polyfunctional monomer), or an oligomer or resin or the like, having a reactive unsaturated group can be polymerized.

When an epoxy resin is used in the above resin component, it is preferable to use a curing agent. By blending a curing agent, molding materials obtained from the resin composition can be firmly molded, whereby the mechanical strength can be improved. Here, the content of the curing agent may be appropriately set depending upon the kinds of the curing agents used.

As the resin in the embodiment A, one or more resins selected from the group consisting of thermoplastic resins, and curable resins selected from epoxy resins, (meth)acrylic resins, phenolic resins, unsaturated polyester resins, polyurethane resins, or polyimide resins are preferably used.

The contents of each component in the resin composition of the embodiment A, which may depend on the kinds of the resins, are as follows.

The content of the resin in the resin composition of the embodiment A is preferably 50% by mass or more, more preferably 60% by mass or more, even more preferably 70% by mass or more, even more preferably 80% by mass or more, and even more preferably 85% by mass or more, from the viewpoint of producing a molded article, and the content is preferably 99.5% by mass or less, more preferably 99% by mass or less, even more preferably 98% by mass or less, and even more preferably 95% by mass or less, from the viewpoint of containing modified cellulose fibers.

The content of the modified cellulose fibers in the resin composition of the embodiment A is preferably 0.5% by mass or more, more preferably 1% by mass or more, even more preferably 2% by mass or more, and even more preferably 5% by mass or more, from the viewpoint of mechanical strength, dimensional stability, and heat resistance of the resin composition obtained, and the content is preferably 50% by mass or less, more preferably 40% by mass or less, even more preferably 30% by mass or less, even more preferably 20% by mass or less, and even more preferably 15% by mass or less, from the viewpoint of moldability and costs of the resin composition obtained.

The amount of the modified cellulose fibers in the resin composition of the embodiment A, based on 100 parts by mass of the resin, is preferably 0.5 parts by mass or more, more preferably 1 part by mass or more, even more preferably 2 parts by mass or more, and still even more preferably 5 parts by mass or more, from the viewpoint of mechanical strength, dimensional stability, and heat resistance of the resin composition obtained, and the amount is preferably 100 parts by mass or less, more preferably 70 parts by mass or less, even more preferably 45 parts by mass or less, even more preferably 25 parts by mass or less, and even more preferably 20 parts by mass or less, from the viewpoint of moldability and costs of the resin composition obtained.

The resin composition of the embodiment A can contain other components besides those mentioned above a compatibilizing agent; a plasticizer; a crystal nucleating agent; a filler including an inorganic filler and an organic filler; a hydrolysis inhibitor; a flame retardant; an antioxidant; a lubricant such as a hydrocarbon-based wax or an anionic surfactant; an ultraviolet absorbent; an antistatic agent; an anti-clouding agent; a photostabilizer; a pigment; a mildew-proof agent; a bactericidal agent; a blowing agent; a surfactant; a polysaccharide such as starch or alginic acid; a natural protein such as gelatin, glue, or casein; an inorganic compound such as tannin, zeolite, ceramics, or metal powder; a perfume; a flowability modulator; a leveling agent; an electroconductive agent; a ultraviolet dispersant; a deodorant; or the like, within the range that would not impair the effects of the present invention. The compatibilizing agent includes a compound composed of a polar group having a high affinity with the cellulose and a hydrophobic group having a high affinity with the resin. More specifically, examples of the polar group include, for example, maleic anhydride, maleic acid, and glycidyl methacrylate, and examples of the hydrophobic group include, for example, polypropylene, polyethylene, and the like. Similarly, other polymer materials and other resin compositions can be added within the range that would not impair the effects of the present invention. As the content proportion of the optional additive, the optional additive may be properly contained within the range that would not impair the effects of the present invention. For example, the content proportion in the resin composition is preferably 20% by mass or less, more preferably 10% by mass or so or less, and even more preferably 5% by mass or so or less.

The resin composition of the embodiment A can be prepared without particular limitations, so long as the resin composition contains the above resin and the modified cellulose fibers. For example, the resin composition can be prepared by stirring raw materials containing the above resin and the modified cellulose fibers, and further optionally various additives with a Henschel mixer or the like, melt-kneading with a known kneader such as a tightly closed kneader, a single-screw or twin-screw extruder, an open roller-type kneader or the like, or subjecting to a solvent casting method.

The method for producing a resin composition of the embodiment A is not particularly limited, so long as the method includes the step of mixing the above resin and the modified cellulose fibers of the present invention. For example, examples of preferred method for production include a method including the following steps:

step A-1) introducing (a) a nonionic alkylene oxide compound having a total number of carbon atoms of 3 or more and 4 or less per molecule to a cellulose-based raw material via an ether bond, in the presence of a base, step A-2) introducing (b) one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to cellulose fibers obtained in the step 1 via an ether bond, in the presence of the base, and step (A-3): mixing the modified cellulose fibers obtained in the step (A-2), with one or more resins selected from the group consisting of a thermoplastic resin, and a curable resin selected from an epoxy resin, a (meth)acrylic resin, a phenolic resin, an unsaturated polyester resin, a polyurethane resin, or a polyimide resin.

In the step (A-1) and the step (A-2), the modified cellulose fibers of the present invention are prepared. For details, the section of the method for producing modified cellulose fibers of the present invention can be referred. Here, the modified cellulose fibers obtained can be also subjected to a subsequent step after subjecting them to a known finely fibrillating treatment.

In the step (A-3), the modified cellulose fibers obtained in the step (A-2) is mixed with the above resin. For example, a mixture can be prepared by subjecting raw materials containing the above resins and the modified cellulose fibers, and further optionally various additives to melt-kneading with a known kneader or a solvent casting method. The conditions for melt-kneading and solution mixing, i.e. temperature, time, can be appropriately set in accordance with known techniques depending upon the kinds of the resins used.

The resin composition of the embodiment A thus obtained has favorable workability and excellent heat resistance, so that the resin composition can be suitably used in various applications such as daily sundries, household electric appliance parts, packaging materials for household electric appliance parts, and automobile parts.

Embodiment B

In addition, in the present invention, as a resin composition of an embodiment B, a rubber-based resin can be used. As the rubber-based resin, a product blended with a carbon black as a reinforcing material is widely used in order to increase its strength, but its reinforcing effects are considered to be limited. However, in the present invention, since the dispersibility in the resin is excellent by blending the modified cellulose fibers of the present invention with the rubber-based resin, it is considered to be made possible to provide a resin composition having excellent mechanical strength, reduced energy loss, and dimensional stability.

The rubber used in the present invention is, but not particularly limited to, preferably a diene-based rubber, from the viewpoint of reinforcing ability. Besides the diene-based rubbers, a non-diene-based rubber such as a urethane rubber, a silicone rubber, or a polysulfide rubber can also be used. The diene-based rubber includes natural rubber (NR), polyisoprene rubber (IR), polybutadiene rubber (BR), styrene-butadiene copolymer rubber (SBR), butyl rubber (IIR), butadiene-acrylonitrile copolymer rubber (NBR), chloroprene rubber (CR) and modified rubbers, and the like. The modified rubber includes epoxidized natural rubber, hydrogenated natural rubber, hydrogenated butadiene-acrylonitrile copolymer rubber (IINBR), and the like. Among them, one or more members selected from natural rubber (NR), polyisoprene rubber (IR), polybutadiene rubber (BR), styrene-butadiene copolymer rubber (SBR), a chloroprene rubber (CR), and modified rubbers are preferred, and one or more members selected from natural rubber (NR), styrene-butadiene copolymer rubber (SBR), chloroprene rubber (CR), and modified rubbers are more preferred, from the viewpoint of satisfying both of excellent processability and high impact resilience of the rubber composition. The diene-based rubbers can be used alone or in a combination of two or more kinds.

The contents of each of the components when the resin composition of the embodiment B is a rubber composition are as follows.

The content of the rubber in the rubber composition of the embodiment B is preferably 30% by mass or more, more preferably 45% by mass or more, and even more preferably 55% by mass or more, from the viewpoint of mold processability of the composition, and the content is preferably 95% by mass or less, more preferably 90% by mass or less, even more preferably 80% by mass or less, and still even more preferably 70% by mass or less, from the viewpoint of containing modified cellulose fibers, and the like.

The content of the modified cellulose fibers in the rubber composition of the embodiment B is preferably 1% by mass or more, more preferably 2% by mass or more, even more preferably 5% by mass or more, and still even more preferably 10% by mass or more, from the viewpoint of mechanical strength, reduced energy loss, and dimensional stability of the composition obtained, and the content is preferably 30% by mass or less, more preferably 20% by mass or less, and even more 15% by mass or less, from the viewpoint of operability during the production.

The amount of the modified cellulose fibers in the rubber composition of the embodiment B, based on 100 parts by mass of the rubber, is preferably 1 part by mass or more, more preferably 5 parts by mass or more, even more preferably 10 parts by mass or more, and still even more preferably 15 parts by mass or more, from the viewpoint of mechanical strength, reduced energy loss, and dimensional stability obtained, and the content is preferably 30 parts by mass or less, more preferably 25 parts by mass or less, and even more preferably 20 parts by mass or less, from the viewpoint of operability during the production.

The rubber composition of the embodiment B can be blended with a conventionally general amount of various additives which are blended in tires and other general rubbers, such as reinforcing fillers, vulcanization agents, vulcanization accelerators, vulcanization retarders, age resistors, process oils, vegetable fats and oils, scorching inhibitors, zinc flower, stearic acid, magnesium oxide, waxes, and phenolic resins, as desired, which are ordinarily used in the rubber industrial fields, within the range that would not impair the object of the present invention.

As the reinforcing filler, a carbon black, silica or the like is suitably used, and the carbon black includes, for example, channel black; furnace black such as SAF, ISAF, N-339, HAF, N-351, MAF, FEF, SRF, GPF, ECF, and N-234; thermal black such as FT and MT; acetylene black, and the like. The carbon black may be constituted by a single species, or carbon blacks may be constituted by plural species.

The vulcanization agent includes, for example, sulfur, sulfur compounds, oximes, nitroso compounds, polyamines, organic peroxides, and the like. The vulcanization agent may be used alone in a single species or in a combination of plural species.

The vulcanization accelerator includes, for example, guanidines, aldehyde-amines, aldehyde-ammonia, thiazoles, sulfenamides, thioureas, thiurams, dithiocarbamates, xanthates, and the like. The vulcanization accelerator may be used alone in a single species or in a combination of plural species.

The vulcanization retarder includes, for example, aromatic organic acids such as salicylic acid, phthalic anhydride, and benzoic acid, and nitroso compounds such as N-nitrosodiphenylamine, N-nitroso-2,2,4-trimethyl-1,2-dihydroquinone, and N-nitrophenyl-β-naphthylamine, and the like. The vulcanization retarder may be used alone in a single species or in a combination of plural species.

The age resistor includes, for example, amines, quinolines, hydroquinone derivatives, monophenols, polyphenols, thiobisphenols, hindered phenols, phosphite esters, and the like. The age resistor may be used alone in a single species or in a combination of plural species.

The process oil includes paraffin-based process oils, naphthenic process oils, aromatic process oils, and the like. The process oil may be used alone in a single species or in a combination of plural species.

The vegetable fats and oils include castor oil, cottonseed oil, linseed oil, rapeseed oil, soybean oil, palm oil, coconut oil, peanut oil, vegetable wax, rosins, pine oil, and the like. The vegetable fats and oils may be used alone in a single species or in a combination of plural species.

The rubber composition of the embodiment B can be prepared without particular limitations, so long as the rubber composition contains the rubber and the above modified cellulose fibers. For example, the rubber composition can be prepared by mixing raw materials containing the rubber and the modified cellulose fibers, and further optionally various additives with, for example, an open-type kneader such as a roller, or a tightly closed kneader such as a Banbury mixer. The temperature during mixing in a molten state is usually from 10° to 200° C., and preferably from 20° to 180° C. In addition, a rubber composition may be prepared by preparing a solution in which a rubber and modified cellulose fibers are dissolved with an organic solvent, and thereafter removing the organic solvent component.

The method for producing a rubber composition of the embodiment B is not particularly limited, so long as the method includes the step of mixing the rubber and the modified cellulose fibers of the present invention. For example, examples of preferred method for production include a method including the following steps:
step B-1) introducing (a) a nonionic alkylene oxide compound having a total number of carbon atoms of 3 or more and 4 or less per molecule to a cellulose-based raw material via an ether bond, in the presence of a base,
step B-2) introducing (b) one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to cellulose fibers obtained in the step 1 via an ether bond, in the presence of the base, and
step (B-3): mixing the modified cellulose fibers obtained in the step (B-2), with a rubber.

In the step (B-1) and the step (B-2), the modified cellulose fibers of the present invention are prepared. For details, the section of the method for producing modified cellulose fibers of the present invention can be referred. Here, the modified cellulose fibers obtained can also be subjected to a subsequent step after subjecting them to a known finely fibrillating treatment.

In the step (B-3), the modified cellulose fibers obtained in the step (B-2) and the rubber are mixed. The subjects to be mixed may be only the rubber and the modified cellulose fibers, or various additives can be optionally further used. The number of mixing may be in a single batch or divided several times and mixed, and the raw materials can also be additionally supplied for each mixing step. For example, a step of mixing raw materials other than a vulcanization agent (a kneading step A) and a step of mixing the mixture obtained with a vulcanization agent (a kneading step B) may be carried out. In addition, a kneading step C may be carried out between the kneading step A and the kneading step B, under the same conditions as in the kneading step A in a state that a vulcanization agent is not mixed, for the purpose of lowering the viscosity of the mixture obtained in the kneading step A or improving dispersibility of various additives. The mixing can be carried out by a known method using, for example, an open-type kneader such as a roller, or a tightly closed kneader such as a Banbury mixer. In addition, a rubber composition can be obtained by dissolving a rubber with an organic solvent such as toluene, mixing a rubber solution obtained with modified cellulose fibers, and thereafter removing an organic solvent component by a drying step.

The rubber composition of the embodiment B can be applied to various rubber manufactured articles applications by using a rubber composition prepared by a method mentioned above, optionally subjecting the composition to appropriate mold processing, and thereafter vulcanizing or crosslinking a molded product.

The rubber composition of the embodiment B has favorable processability and excellent reduced energy loss while showing favorable mechanical strength, so that the rubber composition can be suitably used in various applications such as daily sundries, household electric appliance parts, and automobile parts, and especially automobile applications.

In addition, as the rubber manufactured articles using the rubber composition of the embodiment B, for example, rubber parts for industrial use will be explained. The rubber parts for industrial use include belts and hoses, and the like, and these rubber parts can be produced by subjecting a rubber composition of the present invention optionally blended with various additives to extrusion processing in line with the shape of various parts at the unvulcanized stage to mold, thereby forming unvulcanized rubber parts, and heating the unvulcanized rubber parts with pressure in a vulcanization machine, to provide various rubber parts for industrial use. The improvement in mechanical strength can realize improvements in fundamental performance or miniaturization and thinning of parts, losses in internal heat generation owing to reduced energy loss can realize improvement in durability and the like, and dimensional stability can realize improvement in processing or engagement accuracy or the like.

In addition, for example, in a case where a tire is produced, as the rubber manufactured article using the rubber composition of the embodiment B, the tire can be produced by subjecting a rubber composition of the present invention optionally blended with various additives to extrusion processing in line with the shape of each part of the tire such as treads at an unvulcanized stage, molding the extruded parts on a tire molding machine by an ordinary method, pasting together with other tire members to form an unvulcanized tire, and heating the unvulcanized tire with pressure in a vulcanization machine. The improvement in mechanical strength can realize miniaturization and thinning of various parts, the reduced energy loss can realize rolling resistance and improvement in conservation of energy, and dimensional stability can realize improvement in parts assembling accuracy and the like.

With respect to the above-mentioned embodiments, the present invention further discloses the following modified cellulose fibers and methods for producing the modified cellulose fibers, and resin compositions containing the modified cellulose fibers.

<1> Modified cellulose fibers, wherein each of
(A) one or more substituents selected from substituents represented by the following general formula (1) and substituents represented by the following general formula (2):

$$-CH_2-CH(OH)-R_1 \quad (1)$$

$$-CH_2-CH(OH)-CH_2-(OA)_n-O-R_1 \quad (2)$$

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms, and
(B) a substituent represented by the following general formula (3):

$$-CH_2-CH(OH)-R_2 \quad (3)$$

wherein $R_2$ in the general formula (3) is an alkyl group having 1 or more carbon atoms and 2 or less carbon atoms, is independently bonded to cellulose fibers via an ether bond, wherein the modified cellulose fibers have a cellulose I crystal structure.

<2> The modified cellulose fibers according to the above <1>, wherein the number of carbon atoms of $R_1$ in the general formula (1) is preferably 4 or more, more preferably 6 or more, and even more preferably 8 or more, and preferably 25 or less, more preferably 20 or less, even more preferably 18 or more, and still even more preferably 16 or less.

<3> The modified cellulose fibers according to the above <1> or <2>, wherein the number of carbon atoms of $R_1$ in the general formula (2) is preferably 4 or more, more preferably 6 or more, and even more preferably 8 or more, and preferably 27 or less, more preferably 22 or less, even more preferably 20 or less, and even more preferably 18 or less.

<4> The modified cellulose fibers according to any one of the above <1> to <3>, wherein the number of carbon atoms of A in the general formula (2) is preferably 2 or more, and preferably 4 or less, and more preferably 3 or less.

<5> The modified cellulose fibers according to any one of the above <1> to <4>, wherein n in the general formula (2) is preferably 3 or more, more preferably 5 or more, and even more preferably 10 or more, and preferably 40 or less, more preferably 30 or less, even more preferably 20 or less, and even more preferably 15 or less.

<6> The modified cellulose fibers according to any one of the above <1> to <5>, wherein the combination of A and n in the general formula (2) is preferably a combination in which A is a linear or branched, divalent saturated hydrocarbon group having 2 or more carbon atoms and 3 or less carbon atoms, and n is a number of 0 or more and 20 or less, and more preferably a combination in which A is a linear or branched, divalent saturated hydrocarbon group having 2 or more carbon atoms and 3 or less carbon atoms, and n is a number of 5 or more and 15 or less.

<7> The modified cellulose fibers according to any one of the above <1> to <6>, wherein $R_2$ in the general formula (3) is selected from a methyl group and an ethyl group.

<8> The modified cellulose fibers according to any one of the above <1> to <7>, wherein the substituent represented by the general formula (1) is preferably a group selected from a propylhydroxyethyl group, a butylhydroxyethyl group, a pentylhydroxyethyl group, a hexylhydroxyethyl group, a heptylhydroxyethyl group, an octylhydroxyethyl group, a nonylhydroxyethyl group, a decylhydroxyethyl group, an undecylhydroxyethyl group, a dodecylhydroxyethyl group, a hexadecylhydroxyethyl group, an octadecylhydroxyethyl group, an icosylhydroxyethyl group, and a triacontylhydroxyethyl group.

<9> The modified cellulose fibers according to any one of the above <1> to <8>, wherein the substituent represented by the general formula (2) is preferably a group selected from a 3-hexoxyethylene oxide-2-hydroxy-propyl group, a 3-hexoxy-2-hydroxy-propyl group, a 3-octoxyethylene oxide-2-hydroxy-propyl group, a 3-octoxy-2-hydroxy-propyl group, a 6-ethyl-3-hexoxy-2-hydroxy-propyl group, a 6-ethyl-3-hexoxyethylene oxide-2-hydroxy-propyl group, a 3-decoxyethylene oxide-2-hydroxy-propyl group, a 3-decoxy-2-hydroxy-propyl group, a 3-dodecoxyethylene oxide-2-hydroxy-propyl group, a 3-dodecoxy-2-hydroxy-propyl group, a 3-hexadecoxyethylene oxide-2-hydroxy-propyl group, a 3-hexadecoxy-2-hydroxy-propyl group, a 3-octadecoxyethylene oxide-2-hydroxy-propyl group, and a 3-octadecoxy-2-hydroxy-propyl group.

<10> The modified cellulose fibers according to any one of the above <1> to <9>, wherein the substituent represented by the general formula (3) is preferably a group selected from a 2-hydroxy-propyl group and a 2-hydroxy-butyl group.

<11> The modified cellulose fibers according to any one of the above <1> to <10>, wherein the introduction ratio of the substituent selected from the substituents represented by the general formula (1) and the substituents represented by the general formula (2) defined above, per mol of the anhydrous glucose unit, of the cellulose is preferably 0.001 mol or more, more preferably 0.005 mol or more, even more preferably 0.01 mol or more, even more preferably 0.05 mol or more, even more preferably 0.1 mol or more, even more preferably 0.2 mol or more, and even more preferably 0.3 mol or more, and preferably 1.5 mol or less, more preferably 1.3 mol or less, even more preferably 1.0 mol or less, even more preferably 0.8 mol or less, even more preferably 0.6 mol or less, and even more preferably 0.5 mol or less.

<12> The modified cellulose fibers according to any one of the above <1> to <11>, wherein the introduction ratio of the substituent represented by the general formula (3) defined above, per mol of the anhydrous glucose unit, of the cellulose is preferably 1.5 mol or less, more preferably 1.0 mol or less, and even more preferably 0.8 mol or less, and preferably 0.01 mol or more, more preferably 0.02 mol or more, and even more preferably 0.04 mol or more.

<13> The modified cellulose fibers according to any one of the above <1> to <12>, wherein the average fiber size is preferably 5 µm or more, more preferably 7 µm or more, and even more preferably 10 µm or more, and preferably 100 µm or less, more preferably 70 µm or less, even more preferably 50 µm or less, even more preferably 40 µm or less, and even more preferably 30 µm or less.

<14> The modified cellulose fibers according to any one of the above <1> to <12>, wherein the average fiber size is preferably 1 nm or more, more preferably 3 nm or more, even more preferably 10 nm or more, and even more preferably 20 nm or more, and preferably 500 nm or less, more preferably 300 nm or less, even more preferably 200 nm or less, even more preferably 150 nm or less, and still even more preferably 120 nm or less.

<15> The modified cellulose fibers according to any one of the above <1> to <14>, wherein the crystallinity is preferably 10% or more, more preferably 15% or more, and even more preferably 20% or more, and preferably 90% or less, more preferably 85% or less, even more preferably 80% or less, and even more preferably 75% or less.

<16> The modified cellulose fibers according to any one of the above <1> to <15>, wherein the measured viscosity with an E-type viscometer, cone rotor: 1° 34'×R24, under conditions of 25° C. and 1 rpm, of a dispersion having a concentration of 0.2% by mass obtained by subjecting the cellulose fibers to a finely dispersing treatment 10 times at a pressure of 100 MPa with a high-pressure homogenizer such as a high-pressure, wet type media-less finely fibrillating apparatus, for example, NanoVater L-ES manufactured by YOSHIDA KIKAI CO., LTD. in any one of the organic solvents selected from dimethylformamide, methyl ethyl ketone, and toluene is preferably 15 mPa·s or more, more preferably 20 mPa·s or more, even more preferably 30 mPa·s or more, even more preferably 50 mPa·s or more, still even more preferably 100 mPa·s or more, and still even more preferably 150 mPa·s or more, and preferably 10,000 mPa·s or less, more preferably 8,000 mPa·s or less, and even more preferably 5,000 mPa·s or less.

<17> A method for producing modified cellulose fibers, including introducing (b) a nonionic alkylene oxide compound having a total number of carbon atoms of 3 or more and 4 or less per molecule, and (a) one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to a cellulose-based raw material via an ether bond, in the presence of a base, concurrently or separately.

<18> The method according to the above <17>, wherein the introduction of the compound (a) and the compound (b) is concurrently carried out.

<19> The method according to the above <17>, wherein the compound (a) is first introduced, and the compound (b) is then introduced.

<20> The method according to the above <17>, wherein the compound (b) is first introduced, and the compound (a) is then introduced.

<21> The method according to the above <17>, wherein the method includes the following step I-1 and step II-2:

step II-1): introducing (b) a nonionic alkylene oxide compound having a total number of carbon atoms of 3 or more and 4 or less per molecule to a cellulose-based raw material via an ether bond, in the presence of a base, and step II-2) introducing (a) one or more compounds selected from nonionic alkylene oxide compounds having a total number of carbon atoms of 5 or more and 32 or less per molecule and nonionic glycidyl ether compounds having a total number of carbon atoms of 5 or more and 100 or less per molecule to cellulose fibers obtained in the step II-1 via an ether bond, in the presence of the base.

<22> The method according to any one of the above <17> to <21>, wherein the average fiber size of the cellulose-based raw material is preferably 5 µm or more, more preferably 7 µm or more, even more preferably 10 µm or more, and even more preferably 15 µm or more, and preferably 10,000 µm or less, more preferably 5,000 µm or less, even more preferably 1,000 µm or less, even more preferably 500 µm or less, and still even more preferably 100 µm or less.

<23> The method according to any one of the above <17> to <21>, wherein the average fiber size of the cellulose-based raw material is preferably 1 nm or more, more preferably 2 nm or more, even more preferably 3 nm or more, and even more preferably 10 nm or more, and preferably 500 nm or less, more preferably 300 nm or less, even more preferably 200 nm or less, even more preferably 100 nm or less, and still even more preferably 80 nm or less.

<24> The method according to any one of the above <17> or <23>, wherein the cellulose content in the cellulose-based raw material is preferably 30% by mass or more, more preferably 50% by mass or more, and even more preferably 70% by mass or more, and preferably 99% by mass or less, more preferably 98% by mass or less, even more preferably 95% by mass or less, and even more preferably 90% by mass or less.

<25> The method according to any one of the above <17> to <24>, wherein the water content in the cellulose-based raw material is preferably 0.01% by mass or more, more preferably 0.1% by mass or more, even more preferably 0.5% by mass or more, even more preferably 1.0% by mass or more, even more preferably 1.5% by mass or more, and even more preferably 2.0% by mass or more, and preferably 50% by mass or less, more preferably 40% by mass or less, even more preferably 30% by mass or less, and even more preferably 20% by mass or less.

<26> The method according to any one of the above <17> to <25>, wherein the base is preferably one or more members selected from the group consisting of alkali metal hydroxides, alkaline earth metal hydroxides, primary to tertiary amines, quaternary ammonium salts, imidazole and derivatives thereof, pyridine and derivatives thereof, and alkoxides.

<27> The method according to the above <26>, wherein the alkali metal hydroxides and the alkaline earth metal hydroxide are selected from the group consisting of sodium hydroxide, potassium hydroxide, lithium hydroxide, calcium hydroxide, and barium hydroxide.

<28>. The method according to the above <26>, wherein the primary to tertiary amines are selected from the group consisting of ethylenediamine, diethylamine, proline, N,N,N',N'-tetramethylethylenediamine, N,N,N',N'-tetramethyl-1,3-propanediamine, N,N,N',N'-tetramethyl-1,6-hexanediamine, tris(3-dimethylaminopropyl)amine, N,N-dimethylcyclohexylamine, and triethylamine.

<29> The method according to the above <26>, wherein the quaternary ammonium salt is selected from the group consisting of tetrabutylammonium hydroxide, tetrabutylammonium chloride, tetrabutylammonium fluoride, tetrabutylammonium bromide, tetraethylammonium hydroxide, tetraethylammonium chloride, tetraethylammonium fluoride, tetraethylammonium bromide, tetramethylammonium hydroxide, tetramethylammonium chloride, tetramethylammonium fluoride, and tetramethylammonium bromide.

<30> The method according to the above <26>, wherein the imidazole and derivatives thereof are selected from the group consisting of 1-methylimidazole, 3-aminopropylimidazole, and carbonyldiimidazole.

<31> The method according to the above <26>, wherein the pyridine and derivatives thereof are selected from the group consisting of N,N-dimethyl-4-aminopyridine and picoline.

<32> The method according to the above <26>, wherein the alkoxide is selected from the group consisting of sodium methoxide, sodium ethoxide, and potassium t-butoxide.

<33> The method according to any one of the above <17> to <32>, wherein the amount of the base, based on the anhydrous glucose unit of the cellulose-based raw material, is preferably 0.01 equivalents or more, more preferably 0.05 equivalents or more, even more preferably 0.1 equivalents or more, and even more preferably 0.2 equivalents or more, and preferably 10 equivalents or less, more preferably 8 equivalents or less, even more preferably 5 equivalents or less, and even more preferably 3 equivalents or less.

<34> The method according to any one of the above <17> to <33>, wherein the compound having a substituent represented by the general formula (3), which is a compound (b), is preferably a nonionic alkylene oxide compound represented by the following general formula (3A):

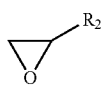

(3A)

wherein $R_2$ is an alkyl group having 1 or more carbon atoms and 2 or less carbon atoms.

<35> The method according to the above <34>, wherein the compound represented by the general formula (3A) is selected from 1,2-epoxypropane and 1,2-epoxybutane.

<36> The method according to the above <17> to <35>, wherein the amount of the compound (b), based on the anhydrous glucose unit of the cellulose-based raw material, may be preferably 5.0 equivalents or less, and the lower limit is 0.02 equivalents or so.

<37> The method according to any one of the above <17> to <36>, wherein the reaction temperature of the compound (b) is preferably 30° C. or higher, more preferably 35° C. or higher, and even more preferably 40° C. or higher, and preferably 120° C. or lower, more preferably 110° C. or lower, even more preferably 100° C. or lower, even more preferably 90° C. or lower, even more preferably 80° C. or lower, and even more preferably 70° C. or lower.

<38> The method according to the above any one of the above <17> to <37>, wherein the compound having a substituent represented by the general formula (1), which is a compound (a), is preferably a nonionic alkylene oxide compound represented by the following general formula (1A):

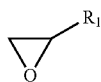

(1A)

wherein $R_1$ is a linear or branched alkyl group having 3 or more carbon atoms and 30 or less carbon atoms, and wherein a total number of carbon atoms of the compound is preferably 6 or more, and more preferably 8 or more, and preferably 22 or less, more preferably 18 or less, even more preferably 14 or less, and even more preferably 12 or less.

<39> The method according to the above <38>, wherein the compound represented by the general formula (1A) is selected from 1,2-epoxyhexane, 1,2-epoxydecane, and 1,2-epoxyoctadecane.

<40> The method according to any one of the above <17> to <39>, wherein the compound having a substituent represented by the general formula (2), which is a compound (a), is preferably a nonionic glycidyl ether compound represented by the following general formula (2A):

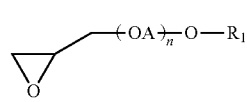

(2A)

wherein $R_1$ is a linear or branched alkyl group having 3 or more carbon atoms and 30 or less carbon atoms; A is a linear or branched, divalent saturated hydrocarbon group having 1 or more carbon atoms and 6 or less carbon atoms; and n is a number of 0 or more and 50 or less, and wherein a total number of carbon atoms of the compound is preferably 6 or more, more preferably 10 or more, and even more preferably 20 or more, and preferably 75 or less, more preferably 50 or less, and even more preferably 25 or less.

<41> The method according to the above <40>, wherein the compound represented by the general formula (2A) is selected from butyl glycidyl ether, 2-ethylhexyl glycidyl ether, dodecyl glycidyl ether, stearyl glycidyl ether, and polyoxyalkylene alkyl ethers.

<42> The method according to any one of the above <17> to <41>, wherein the amount of the compound (a), based on the anhydrous glucose unit of the cellulose-based raw material, is preferably 0.01 equivalents or more, more preferably 0.1 equivalents or more, even more preferably 0.3 equivalents or more, even more preferably 0.5 equivalents or more, and still even more preferably 1.0 equivalent or more, and preferably 10 equivalents or less, more preferably 8 equivalents or less, even more preferably 6.5 equivalents or less, and even more preferably 5 equivalents or less.

<43> The method according to any one of the above <17> to <42>, wherein the reaction temperature of the compound (a) is preferably 40° C. or higher, more preferably 50° C. or higher, and even more preferably 60° C. or higher, and preferably 120° C. or lower, more preferably 110° C. or lower, and even more preferably 100° C. or lower.

<44> The modified cellulose fibers according to any one of the above <1> to <16>, which are represented by the following general formula (4):

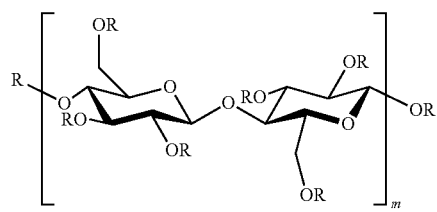

(4)

wherein R, which may be identical or different, is hydrogen, or (A) a substituent selected from substituents represented by the general formula (1) defined above and substituents represented by the general formula (2) defined above, or (b) a substituent represented by the general formula (3) defined above; and m is an integer of 20 or more and 3,000 or less, with proviso that a case where all R's are simultaneously hydrogens, a case where all are simultaneously substituents (A), and a case where all are simultaneously substituents (B) are excluded.

<45> A resin composition containing modified cellulose fibers as defined in any one of the above <1> to <16>, and <44> and a thermoplastic resin or curable resin.

<46> The resin composition according to the above <45>, wherein the thermoplastic resin includes saturated polyester-based resins such as polylactic acid resins; olefinic resins such as polyethylene-based resins, polypropylene-based resins, and ABS resins; cellulose-based resins such as triacetylated cellulose and diacetylated cellulose; nylon resins; vinyl chloride resins; styrene resins; vinyl ether resins; polyvinyl alcohol resins; polyamide-based resins; polycarbonate-based resins; polysulfonate-based resins, and the like, and wherein the curable resin is preferably a photo-curable resin and/or a thermosetting resin, and examples include epoxy resins, (meth)acrylic resins, phenolic resins, unsaturated polyester resins, polyurethane resins, or polyimide resins.

<47> The resin composition according to the above <45> or <46>, which can be suitably used in various applications such as daily sundries, household electric appliance parts, packaging materials for household electric appliance parts, and automobile parts.

<48> A resin composition, which is a rubber composition containing modified cellulose fibers as defined in any one of the above <1> to <16>, and <44> and a rubber-based resin.

<49> The resin composition according to the above <48>, wherein as the rubber, a diene-based rubber is preferred, which includes natural rubber (NR), polyisoprene rubber (IR), polybutadiene rubber (BR), styrene-butadiene copolymer rubber (SBR), butyl rubber (IIR), butadiene-acrylonitrile copolymer rubber (NBR), chloroprene rubber (CR) and modified rubber, and the like, and the modified rubber includes epoxidized natural rubber, hydrogenated natural rubber, hydrogenated butadiene-acrylonitrile copolymer rubber (HNBR), and the like, among which one or more members selected from natural rubber (NR), polyisoprene rubber (IR), polybutadiene rubber (BR), styrene-butadiene copolymer rubber (SBR), chloroprene rubber (CR), and modified rubbers are preferred, and one or more members selected from natural rubber (NR), styrene-butadiene copolymer rubber (SBR), a chloroprene rubber (CR), and modified rubbers are more preferred.

<50> The resin composition according to the above <48> or <49>, which can be suitably used in various applications such as daily sundries, household electric appliance parts, and automobile parts, and especially automobile applications.

<50> The resin composition according to any one of the above <48> to <50>, which is a rubber part for industrial use. <50> The resin composition according to any one of the above <48> to <50>, which is a tire.

EXAMPLES

The present invention will be described more specifically by means of the Examples. Here, the Examples are mere exemplifications of the present invention, without intending to limit the scope of the present invention thereto. Parts in Examples are parts by mass unless specified otherwise. Here, the term "ambient pressure" is 101.3 kPa, and the term "room temperature" is 25° C.

Production Example 1 of Compound Having Substituent—Production of Stearyl Glycidyl Ether Ten kilograms of stearyl alcohol, KALCOL 8098 manufactured by Kao Corporation, 0.36 kg of tetrabutylammonium bromide manufactured by KOEI CHEMICAL COMPANY LIMITED, 7.5 kg of epichlorohydrin manufactured by Dow Chemical Company, and 10 kg of hexane were supplied into a 100-L reactor, and the contents were mixed under a nitrogen atmosphere. While holding a liquid mixture at 50° C., 12 kg of a 48% by mass aqueous sodium hydroxide solution manufactured by Nankai Chemical Co., Ltd. was added dropwise thereto over 30 minutes. After the termination of the dropwise addition, the mixture was aged at 50° C. for additional 4 hours, and thereafter washed with 13 kg of water repeatedly 8 times, to remove salts and alkali. Thereafter, the internal reactor temperature was raised to 90° C., hexane was distilled off from an upper layer, and the mixture was further purged with steam under a reduced pressure of 6.6 kPa to remove low-boiling point compounds. After dehydration, the mixture was subjected to a reduced-pressure distillation at an internal reactor temperature of 250° C. and an internal reactor pressure of 1.3 kPa, to provide 8.6 kg of white stearyl glycidyl ether.

Production Example 2 of Compound Having Substituent—Production of Polyoxyalkylene Alkyl Etherification Agent A 1,000-L reactor was charged with 250 kg of a polyoxyethylene(13)-n-alkyl(C12) ether, EMULGEN 120 manufactured by Kao Corporation, alkyl chain length; n-C12, molar average degree of polymerization of oxyethylene groups: 13, in a molten state, and further 3.8 kg of tetrabutylammonium bromide and 81 kg of epichlorohydrin, and 83 kg of toluene were supplied into the reactor, and the contents were mixed while stirring. While maintaining the internal reactor temperature at 50° C., 130 kg of a 48% by mass aqueous sodium hydroxide solution manufactured by Nankai Chemical Co., Ltd. was added dropwise for 1 hour with stirring. After the termination of the dropwise addition, the mixture was aged for 6 hours with stirring, while maintaining the internal reactor temperature at 50° C. After the termination of aging, the reaction mixture was washed with 250 kg of water 6 times to remove salts and alkali, and thereafter an organic layer was heated to 90° C. under a reduced pressure of 6.6 kPa, to distill off the residual epichlorohydrin, solvents, and water. The mixture was further purged with 250 kg of steam under a reduced pressure, to remove low-boiling point compounds, to provide 240 kg of an n-alkyl(C12) polyoxyethylene(13) glycidyl ether having a structure of the following formula (5):

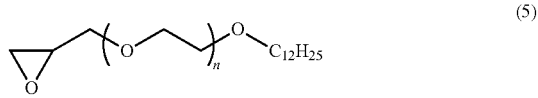

(5)

Production Example 1 of Cellulose-Based Raw Material—Production of Alkali-Treated Bagasse As an entire treatment liquid 937 parts by mass of water, granular sodium hydroxide and ion-exchanged water were added, in amounts so that sodium hydroxide would be 15.2 parts by mass, based on 100 parts by mass of bagasse, the residual sugar cane, on a dry basis, and the contents were heat-treated at a temperature of 120° C. for 2 hours in an autoclave manufactured by TOMY SEIKO CO., LTD., LSX-700. After the treatment, the mixture was filtered and washed with ion-exchanged water, and vacuum-dried for one day and night at 70° C., to provide alkali-treated bagasse in a fibrous form, having an average fiber size of 24 μm, a cellulose content of 70% by mass, and a water content of 3% by mass.

Production Example 2 of Cellulose-Based Raw Material—Production of Powdery Cellulose One-hundred grams of needle-leaf bleached kraft pulp, hereinafter abbreviated as NBKP, manufactured by Fletcher Challenge Canada Ltd., "Machenzie," CSF 650 ml, in a fibrous form, having an average fiber size of 24 μm, a cellulose content of 90% by mass, and a water content of 5% by mass, were weighed out on dry basis, supplied into a batch-type vibrating mill manufactured by CHUO KAKOHKI CO., LTD "MB-1," vessel entire volume: 3.5 L, 13 rods made of SUS304 being used, each rod having a diameter φ of 30 mm, a length of 218 mm, and cross-sectional shape of circular, rod filling ratio of 57%, and subjected to a pulverization treatment for 20 minutes, to provide a powdery cellulose having an average fiber size of 25 μm, and a crystallinity of 35%.

Example 1<Preparation Example 1 of Modified Cellulose Fibers>

The needle-leaf bleached kraft pulp (NBKP) was used as a cellulose-based raw material. At first, to 1.5 g of absolutely dried NBKP were added 3.0 g of a 6.4% by mass aqueous sodium hydroxide solution, prepared from sodium hydroxide granules manufactured by Wako Pure Chemical Industries, Ltd. and ion-exchanged water (0.26 equivalents per equivalent of anhydrous glucose unit (AGU: calculated by assuming that the cellulose-based raw material is entirely constituted by anhydrous glucose units, hereinafter referred to the same) and 4.0 g of methyl isobutyl ketone manufactured by Wako Pure Chemical Industries, Ltd., and the mixture was homogeneously mixed. Thereafter, 0.32 g of propylene oxide manufactured by Wako Pure Chemical Industries, Ltd. (0.6 equivalents per AGU) (compound (b)) was added thereto, and the contents were tightly sealed, and thereafter reacted while allowing to stand at 50° C. for 24 h. After the reaction, the reaction mixture was neutralized with acetic acid manufactured by Wako Pure Chemical Industries, Ltd., and sufficiently washed with a mixed solvent of water and isopropanol manufactured by Wako Pure Chemical Industries, Ltd. to remove impurities. Further, the mixture was vacuum-dried overnight at 50° C. to provide modified cellulose fibers having one kind of substituent.

Next, to 1.0 g of the modified cellulose fibers obtained above were added 6.0 g of acetonitrile manufactured by Wako Pure Chemical Industries, Ltd. and 1.2 g of N,N-dimethyl-4-aminopyridine manufactured by Wako Pure Chemical Industries, Ltd. (DMAP, 1.6 equivalents per AGU), and the mixture was homogeneously mixed. Thereafter, 20.7 g of stearyl glycidyl ether prepared in Production Example 1 of Compound Having Substituent (6 equivalents per AGU) (compound (a)) was added thereto, and the contents were tightly sealed, and thereafter reacted while allowing to stand at 70° C. for 24 h. After the reaction, the reaction mixture was neutralized with acetic acid, and sufficiently washed with dimethylformamide (DMF) and a mixed solvent of water/isopropanol to remove impurities. Further, the mixture was vacuum-dried overnight at 50° C., to provide modified cellulose fibers having two kinds of substituents.

The amount 0.1 g of the modified cellulose fibers having two kinds of substituents obtained were supplied into 49.9 g of a solvent listed in Table 1, and the mixture was stirred with a homogenizer T.K. ROBOMICS manufactured by PRIMIX Corporation at 3,000 rpm for 30 minutes, and thereafter subjected to a 10-pass treatment with a high-pressure homogenizer "NanoVater L-ES" manufactured by YOSHIDA KIKAI CO., LTD. at 100 MPa, to provide a fine modified cellulose dispersion in which finely fibrillated modified cellulose fibers were dispersed, a solid content concentration of which was 0.2% by mass. Here, a solvent manufactured by Wako Pure Chemical Industries, Ltd. was used as a dispersion solvent.

The amount 0.25 g of the modified cellulose fibers having two kinds of substituents obtained were supplied into 49.75 g of a solvent listed in Table 1, and the same treatments were carried out to provide a fine modified cellulose dispersion in which finely fibrillated modified cellulose fibers were dispersed, a solid content concentration of which was 0.5% by mass.

Examples 2 to 8 and Comparative Examples 1 to 2<Preparation Examples 2 to 7, 21 and 22 of Modified Cellulose Fibers>

The compound having substituents was introduced in accordance with the same procedures as in Example 1 except that the each amount of the compound having substituents used was changed to the amount listed in Table 1, to provide modified cellulose fibers. In addition, using modified cellulose fibers obtained, the same procedures as in Example 1 were carried out, to provide a fine modified cellulose dispersion.

Examples 9, 13 to 16 and Comparative Example 3<Preparation Examples 8, 11 to 14, and 23 of Modified Cellulose Fibers>

The same procedures as in Example 2 were employed except that the introduction conditions of compound (a) were changed to as follows, to provide modified cellulose fibers having two kinds of substituents. In addition, using modified cellulose fibers obtained, the same dispersion treatments as in Example 1 were carried out in a solvent listed in Table 2, to provide a fine modified cellulose dispersion.

Example 9

Compound (a): 1,2-Epoxyhexane manufactured by Wako Pure Chemical Industries, Ltd.

Solvent: 2.0 g of Water

Catalyst: 0.27 g of Sodium hydroxide (1.0 equivalent per AGU)

Reaction Conditions: Reacted while allowing to stand at 70° C. for 24 h

Washing Solvent: Mixed solvent of water/isopropanol

Example 13

Compound (a): 1,2-Epoxydecane

Solvent: 4.0 g of DMF

Catalyst: 1.2 g of DMAP (1.6 equivalents per AGU)

Reaction Conditions: Reacted while allowing to stand at 90° C. for 24 h

Washing Solvent: DMF and mixed solvent of water/isopropanol

Example 14

Compound (a): 1,2-Epoxyoctadecane manufactured by Tokyo Chemical Industry Co., Ltd.
Solvent: 4.0 g of DMF
Catalyst: 1.2 g of DMAP (1.6 equivalents per AGU)
Reaction Conditions: Reacted while allowing to stand at 90° C. for 24 h
Washing Solvent: DMF and mixed solvent of water/isopropanol

Example 15

Compound (a): 2-Ethylhexyl glycidyl ether manufactured by Tokyo Chemical Industry Co., Ltd.
Solvent: 4.0 g of DMF
Catalyst: 1.2 g of DMAP (1.6 equivalents per AGU)
Reaction Conditions: Reacted while allowing to stand at 90° C. for 24 h
Washing Solvent: DMF and mixed solvent of water/isopropanol

Example 16

Compound (a): Polyoxyalkylene alkyl etherification agent prepared in Production Example 2 of Compound Having Substituent
Solvent: 4.0 g of Acetonitrile
Catalyst: 1.8 g of Tetrabutylammonium hydroxide manufactured by Wako Pure Chemical Industries, Ltd. (TBAH, 0.8 equivalents per AGU)
Reaction Conditions: Reacted while allowing to stand at 70° C. for 24 h
Washing Solvent: DMF and mixed solvent of water/isopropanol

Comparative Example 3

Compound (a): Glycidyl methyl ether manufactured by Tokyo Chemical Industry Co., Ltd.
Solvent: 2.0 g of Water
Catalyst: 0.27 g of Sodium hydroxide (1.0 equivalent per AGU)
Reaction Conditions: Reacted while allowing to stand at 70° C. for 24 h
Washing Solvent: Mixed solvent of water/isopropanol

Examples 10 to 12<Preparation Examples 9 and 10 of Modified Cellulose Fibers>

To 1.5 g of cellulose-base raw materials listed in Table 2 were added 6.0 g of DMF and 1.8 g of DMAP (1.6 equivalents per AGU), and the mixture was homogeneously mixed. Thereafter, 7.2 g of 1,2-epoxydecane manufactured by Wako Pure Chemical Industries, Ltd. (5 equivalents per AGU) (compound (a)) was added thereto, and the contents were tightly sealed, and thereafter reacted while allowing to stand at 90° C. for 24 h. After the reaction, the reaction mixture was neutralized with acetic acid, and sufficiently washed with DMF and a mixed solvent of water/isopropanol to remove impurities. Further, the mixture was vacuum-dried overnight at 50° C., to provide modified cellulose fibers.

Next, to 1.0 g of the modified cellulose fibers obtained above were added 1.0 g of a 6.4% by mass aqueous sodium hydroxide solution (0.26 equivalents per AGU) and 4.0 g of methyl isobutyl ketone, and the mixture was homogeneously mixed. Thereafter, 1.0 g of propylene oxide (2.8 equivalents per AGU) (compound (b)) was added thereto, and the contents were tightly sealed, and thereafter reacted while allowing to stand at 50° C. for 24 h. After the reaction, the reaction mixture was neutralized with acetic acid, and sufficiently washed with a mixed solvent of water/isopropanol to remove impurities. Further, the mixture was vacuum-dried overnight at 50° C., to provide modified cellulose fibers having two kinds of substituents.

Using modified cellulose fibers having two kinds of substituents obtained, the same dispersion treatments as in Example 1 were carried out in a solvent listed in Table 2, to provide a fine modified cellulose dispersion.

Example 17<Preparation Example 15 of Modified Cellulose Fibers>

The same procedures as in Example 2 were employed except that the conditions of introducing a compound (b) were changed to as follows, to provide modified cellulose fibers having two kinds of substituents. In addition, using modified cellulose fibers obtained, the same dispersion treatments as in Example 1 were carried out in a solvent listed in Table 2, to provide a fine modified cellulose dispersion.
Compound (b): 1,2-Epoxybutane manufactured by Wako Pure Chemical Industries, Ltd.
Solvent: 2.0 g of Water
Catalyst: 0.27 g of Sodium hydroxide (1.0 equivalent per AGU)
Reaction Conditions: Reacted while allowing to stand at 70° C. for 24 h
Washing Solvent: Mixed solvent of water/isopropanol

Examples 18 to 22<Preparation Examples 16 to 22 of Modified Cellulose Fibers>

The same procedures as in Example 2 were employed except that a cellulose-based raw material was changed to that listed in Table 3 to provide modified cellulose fibers having two kinds of substituents. In addition, using modified cellulose fibers obtained, the same dispersion treatments as in Example 1 were carried out in a solvent listed in Table 3 to provide a fine modified cellulose dispersion. Here, the details for cellulose-based raw materials are as set forth below.

LBKP: broad-leaf bleached kraft pulp derived from eucalyptus, manufactured by CENIBRA, in a fibrous form, having an average fiber size of 24 μm, a cellulose content of 90% by mass, and a water content of 5% by mass HYP: High Yield Pulp derived from spruce, manufactured by Rottneros, in a fibrous form, having an average fiber size of 28 μm, a cellulose content of 55% by mass, and a water content of 15% by mass ARBOCEL: ARBOCELL BC200 manufactured by Rettenmaier Co., Ltd., in a powdery form, having an average fiber size of 65 μm, a cellulose content of 90% by mass, and a water content of 5% by mass Powdery Cellulose: powdery cellulose obtained in Production Example 2 of Cellulose-Based Raw Material MFC: microfibrillated cellulose, which was previously subjected to solvent replacement with DMF, manufactured by Daicel FineChem Ltd., "CELISH FD 100-G," having a solid content concentration of 10% by mass, an average fiber size of 100 nm or less, a cellulose content of 90% by mass, and a water content of 3% by mass The modified cellulose fibers obtained were evaluated for substituent introduction ratio, average fiber size (including also average fiber size of cellulose-based raw material), average fiber size after fine fibrillation, and confirmation of the crystal structure (crystallinity) in accordance with the methods of the following Test Examples 1 to 4. In addition, the properties of the dispersion were evaluated in accordance with the following Test Examples 5 to 7. The results are shown in Tables 1 to 3.

Test Example 1—Substituent Introduction Ratio, Degree of Substitution

In modified cellulose fibers obtained):
The % content (% by mass) of the hydrophobic ether group contained in the modified cellulose fibers obtained was calculated in accordance with Zeisel method, which has been known as a method of analyzing an average number of moles added of alkoxy groups of the cellulose ethers described in *Analytical Chemistry*, 51(13), 2172 (1979), "Fifteenth Revised Japan Pharmacopeia (Section of Method of Analyzing Hydroxypropyl Cellulose)" or the like. The procedures are shown hereinbelow.
(i) To a 200 mL volumetric flask was added 0.1 g of n-octadecane, and filled up to a marked line with hexane, to provide an internal standard solution.
(ii) One-hundred milligrams of modified cellulose fibers previously purified and dried, and 100 mg of adipic acid were accurately weighed in a 10 mL vial jar, 2 mL of hydriodic acid was added thereto, and the vial jar was tightly sealed.
(iii) The mixture in the above vial jar was heated with a block heater at 160° C. for 1 hour, while stirring with stirrer chips.
(iv) After heating, 3 mL of the internal standard solution and 3 mL of diethyl ether were sequentially injected to the vial, and a liquid mixture was stirred at room temperature for 1 minute.
(v) An upper layer (diethyl ether layer) of the mixture separated in two layers in the vial jar was analyzed by gas chromatography with "GC2010Plus," manufactured by SHIMADZU Corporation. The analytical conditions were as follows:
Column: DB-5, manufactured by Agilent Technologies, 12 m, 0.2 mm×0.33 μm
Column Temperature: 100° C., heating at 10° C./min, to 280° C. (holding for 10 min)
Injector Temperature: 300° C., detector temperature: 300° C., input amount: 1 μL
The content of the ether groups in the modified cellulose fibers (% by mass) was calculated from a detected amount of the etherification reagent used.
From the ether group content obtained, the molar substitution (MS), amount of moles of substituents based on one mol of the anhydrous glucose unit, was calculated using the following formula (1):

$$MS=(W1/Mw)/((100-W1)/162.14) \quad \text{(Formula 1)}$$

W1: The content of the ether groups in the modified cellulose fibers, % by mass
Mw: The molecular weight of the introduced etherification reagent, g/mol Test Example 2—Average Fiber Sizes of Modified Cellulose Fibers and Cellulose-Based Raw Material The fiber sizes of the modified cellulose fibers and the cellulose-based raw material were obtained by the following method. About 0.3 g of an absolutely dried sample was accurately weighed, and stirred in 1.0 L of ion-exchanged water with a household mixer for one minute, to defibriate the fibers in water. Thereafter, 4.0 L of ion-exchanged water was further added, and the mixture was stirred to make it homogeneous. From the aqueous dispersion obtained, about 50 g was collected and accurately weighed as the measurement liquid. The measurement liquid obtained was analyzed by "Kajaani Fiber Lab" manufactured by Metso Automation, to provide an average fiber size.

Test Example 3—Average Fiber Size of Fine Modified Cellulose Fibers

The dispersion obtained was observed with an optical microscope "Digital Microscope VHX-1000" manufactured by KEYENCE at a magnification of from 300 to 1,000, and calculating an average of 30 or more of fiber strands (calculated by rounding off to a first decimal as a significant digit). In a case where observation with an optical microscope was difficult, a solvent was further added to the cellulose fiber dispersion to provide a 0.0001% by mass dispersion, and the dispersion was dropped on mica and dried to provide an observation sample, and a fiber height of the cellulose fibers in the observation sample was measured with an interatomic force microscope (AFM), Nanoscope III Tapping mode AFM, manufactured by Digital Instrument, the probe Point Probe (NCH) manufactured by NANOSENSORS being used. During the measurements, five or more sets of fine cellulose fibers were extracted from a microscopic image in which the cellulose fibers could be confirmed, and an average fiber size, a fiber size in the dispersion, was calculated from those fiber heights. Here, a case where fibers were aggregated in a dispersion to make analysis impossible was listed as ">10,000."

Test Example 4—Confirmation of Crystal Structure

The crystal structure of the modified cellulose fibers was confirmed by measuring with "Rigaku RINT 2500VC X-RAY diffractometer" manufactured by Rigaku Corporation. The measurement conditions were as follows: X-ray source: Cu/Kα-radiation, tube voltage: 40 kV, tube current: 120 mA, measurement range: diffraction angle 2θ=5° to 45°, scanning speed of X-ray: 10°/min. A sample for the measurement was prepared by compressing pellets to a size having an area of 320 mm$^2$ and a thickness of 1 mm. Also, as to the crystallinity of the cellulose I crystal structure, X-ray diffraction intensity was calculated by the following formula (A):

$$\text{Cellulose } I \text{ Crystallinity (\%)}=[(I22.6-I18.5)/I22.6]\times 100 \quad \text{(A)}$$

wherein I22.6 is a diffraction intensity of a lattice face (002 face)(angle of diffraction 2θ=22.6°), and I18.5 is a diffraction intensity of an amorphous portion (angle of diffraction 2θ=18.50), in X-ray diffraction.
On the other hand, in a case where a crystallinity obtained by the above formula (A) is 35% or less, it is preferable to use a calculated value based on the formula (B) given below as a crystallinity, in accordance with the description of P199-200 of "*Mokushitsu Kagaku Jikken Manyuaru* (*Wood Science Experimental Manual*)," edited by The Japan Wood Research Society, from the viewpoint of improving the calculation accuracy.

Therefore, in a case where a crystallinity obtained by the above formula (A) is 35% or less, a calculated value based on the following formula (B) can be used as a crystallinity:

Cellulose I Crystallinity (%)=[Ac/(Ac+Aa)]×100    (B)

wherein Ac is a total sum of peak areas of a lattice face (002 face)(angle of diffraction 2θ=22.6°), a lattice face (011 face)(angle of diffraction 2θ=15.1°), and a lattice face (0-11 face)(angle of diffraction 2θ=16.2°), Aa is a peak area of an amorphous portion (angle of diffraction 2θ=18.5°), each peak area being calculated by fitting the X-ray diffraction chart obtained to a Gaussian function, in X-ray diffraction.

Test Example 5—Dispersion Stability Test

A cellulose fiber dispersion obtained having a solid content concentration of 0.2% by mass was allowed to stand at room temperature for one week, and the presence or absence of the precipitations was visually confirmed, and evaluated in accordance with the following ranking criteria:
Rank A: No precipitates.
Rank B: Partly precipitates were confirmed.
Rank C: Entire amount was precipitated (complete separation).
The dispersion stability was evaluated in the order of A>B>C, and dispersion stability A shows excellent dispersion stability.

Test Example 6—Viscosity Measurement

The viscosity of a cellulose fiber dispersion obtained having a solid content concentration of 0.2% by mass was measured with an E-type viscometer "VISCOMETER TVE-35H" manufactured by TOKI SANGYO CO., LTD., using cone rotor: 1° 34'×R24, and a temperature-controller "VISCOMATE VM-150III" manufactured by TOKI SANGYO CO., LTD., under the conditions of 25° C., 1 rpm, and one minute. In a case where the measured viscosity is 15 mPa·s or more, excellent thickening effects are shown, and it is shown that the higher the values, the more excellent the thickening properties. Here, when the viscosity was below the lower limit of measurements to make the analysis impossible, it was listed as "N. D."

Test Example 7—Transmittance

The light transmittance of a cellulose fiber dispersion obtained having a solid content of 0.5% by mass at a wavelength of 660 nm was measured with a double beam spectrophotometer "U-2910" manufactured by Hitachi High-Tech Science Corporation and a quartz cell having an optical path length of 10 mm at 25° C. for 1 minute. It is shown that the higher the transmittance measured, the more excellently the cellulose fibers disperse.

TABLE 1

| | | | | | Ex. 1 | Ex. 2 | Ex. 3 | Ex. 4 | Ex. 5 | Ex. 6 |
|---|---|---|---|---|---|---|---|---|---|---|
| Preparation | Ex. No. of Modified Cellulose Fibers | | | | 1 | 2 | 3 | 4 | 5 | 6 |
| Modified Cellulose Fibers | Substituent (A) | Formula (1) | $R_1$: C3-30 | | — | — | — | — | — | — |
| | | | Reaction Rate (per AGU) | | — | — | — | — | — | — |
| | | | Introduction Ratio, Degree of Molar Substitution | | — | — | — | — | — | — |
| | | Formula (2) | $R_1$: C3-30 | | —$C_{18}H_{37}$ | —$C_{18}H_{37}$ | —$C_{18}H_{37}$ | —$C_{18}H_{37}$ | —$C_{18}H_{37}$ | —$C_{18}H_{37}$ |
| | | | n: 0-50 | | 0 | 0 | 0 | 0 | 0 | 0 |
| | | | A: C1-6 | | — | — | — | — | — | — |
| | | | Reaction Rate (per AGU) | | 6.0 | 6.0 | 6.0 | 6.0 | 6.0 | 1.0 |
| | | | Introduction Ratio, Degree of Molar Substitution | | 0.30 | 0.33 | 0.35 | 0.36 | 0.34 | 0.05 |
| | Substituent (B) | Formula (3) | $R_2$: C1-2 | | —$CH_3$ | —$CH_3$ | —$CH_3$ | —$CH_3$ | —$CH_3$ | —$CH_3$ |
| | | | Reaction Rate (per AGU) | | 0.6 | 0.8 | 1.2 | 4.0 | 5.0 | 0.8 |
| | | | Introduction Ratio, Degree of Molar Substitution | | 0.03 | 0.06 | 0.14 | 0.41 | 0.66 | 0.06 |
| | Embodiment of Introducing Substituents | | | | II | II | II | II | II | II |
| | Average Fiber Size, μm | | | | 24 | 23 | 24 | 23 | 24 | 24 |
| | Cellulose Crystal Form | | | | I | I | I | I | I | I |
| | Crystallinity, % | | | | 52 | 48 | 48 | 44 | 45 | 43 |
| | Raw Material Cellulose | | | | NBKP | NBKP | NBKP | NBKP | NBKP | NBKP |
| Dispersion | Dispersion Solvent | | | | toluene | toluene | toluene | toluene | toluene | MEK |
| | Dispersion Stability | | | | A | A | A | A | A | A |
| | Average Fiber Size in Dispersion, nm | | | | 24 | 20 | 19 | 18 | 17 | 25 |
| | Viscosity at 25° C., mPa · s | | | | 2,834 | 4,205 | 4,408 | 4,955 | 3,580 | 890 |
| | 0.5 wt % Transmittance, % | | | | 68 | 72 | 65 | 65 | 62 | 75 |

| | | | | | Ex. 7 | Ex. 8 | Comp. Ex. 1 | Comp. Ex. 2 |
|---|---|---|---|---|---|---|---|---|
| | Preparation Ex. No. of Modified Cellulose Fibers | | | | 6 | 7 | 21 | 22 |
| | Modified Cellulose Fibers | Substituent (A) | Formula (1) | $R_1$: C3-30 | — | — | — | — |
| | | | | Reaction Rate (per AGU) | — | — | — | — |
| | | | | Introduction Ratio, Degree of Molar Substitution | — | — | — | — |
| | | | Formula (2) | $R_1$: C3-30 | —$C_{18}H_{37}$ | —$C_{18}H_{37}$ | — | — |
| | | | | n: 0-50 | 0 | 0 | — | — |

TABLE 1-continued

|  |  |  |  |  |  |  |  |  |
|---|---|---|---|---|---|---|---|---|
|  |  |  | A: C1-6 |  | — | — | — | — |
|  |  |  | Reaction Rate (per AGU) |  | 1.0 | 3.0 | — | — |
|  |  |  | Introduction Ratio, Degree of Molar Substitution |  | 0.05 | 0.13 | — | — |
|  | Substituent (B) | Formula (3) | $R_2$: C1-2 |  | —$CH_3$ | —$CH_3$ | —$CH_3$ | —$CH_3$ |
|  |  |  | Reaction Rate (per AGU) |  | 0.8 | 0.8 | 4.0 | 5.0 |
|  |  |  | Introduction Ratio, Degree of Molar Substitution |  | 0.06 | 0.06 | 0.41 | 0.66 |
|  | Embodiment of Introducing Substituents |  |  |  | II | II | — | — |
|  | Average Fiber Size, μm |  |  |  | 24 | 24 | 24 | 24 |
|  | Cellulose Crystal Form |  |  |  | I | I | I | I |
|  | Crystallinity, % |  |  |  | 43 | 48 | 53 | 45 |
|  | Raw Material Cellulose |  |  |  | NBKP | NBKP | NBKP | NBKP |
| Dispersion | Dispersion Solvent |  |  |  | toluene | toluene | MEK | MEK |
|  | Dispersion Stability |  |  |  | A | A | C | C |
|  | Average Fiber Size in Dispersion, nm |  |  |  | 25 | 20 | >10,000 | >10,000 |
|  | Viscosity at 25° C., mPa·s |  |  |  | 1,565 | 4,747 | N.D. | N.D. |
|  | 0.5 wt % Transmittance, % |  |  |  | 51 | 60 | 0 | 0 |

TABLE 2

|  |  |  |  |  | Ex. 9 | Ex. 10 | Ex. 11 | Ex. 12 | Ex. 13 | Ex. 14 |
|---|---|---|---|---|---|---|---|---|---|---|
| Preparation | Ex. No. of Modified Cellulose Fibers |  |  |  | 8 | 9 | 10 | 10 | 11 | 12 |
| Modified Cellulose Fibers | Substituent (A) | Formula (1) | $R_1$: C3-30 |  | —$C_4H_9$ | —$C_8H_{17}$ | —$C_8H_{17}$ | —$C_8H_{17}$ | —$C_8H_{17}$ | —$C_{16}H_{33}$ |
|  |  |  | Reaction Rate (per AGU) |  | 3.0 | 5.0 | 5.0 | 5.0 | 5.0 | 5.0 |
|  |  |  | Introduction Ratio, Degree of Molar Substitution |  | 0.37 | 0.50 | 0.40 | 0.40 | 0.68 | 0.26 |
|  |  | Formula (2) | $R_1$: C3-30 |  | — | — | — | — | — | — |
|  |  |  | n: 0-50 |  | — | — | — | — | — | — |
|  |  |  | A: C1-6 |  | — | — | — | — | — | — |
|  |  |  | Reaction Rate, per AGU |  | — | — | — | — | — | — |
|  |  |  | Introduction Ratio, Degree of Molar Substitution |  | — | — | — | — | — | — |
|  | Substituent (B) | Formula (3) | $R_2$: C1-2 |  | —$CH_3$ | —$CH_3$ | —$CH_3$ | —$CH_3$ | —$CH_3$ | —$CH_3$ |
|  |  |  | Reaction Rate, per AGU |  | 0.8 | 2.8 | 2.8 | 2.8 | 0.8 | 0.8 |
|  |  |  | Introduction Ratio, Degree of Molar Substitution |  | 0.06 | 0.58 | 0.35 | 0.35 | 0.06 | 0.06 |
|  | Embodiment of Introducing Substituents |  |  |  | II | I | I | I | II | II |
|  | Average Fiber Size, μm |  |  |  | 24 | 22 | 24 | 24 | 23 | 24 |
|  | Cellulose Crystal Form |  |  |  | I | I | I | I | I | I |
|  | Crystallinity, % |  |  |  | 50 | 31 | 53 | 53 | 48 | 52 |
|  | Raw Material Cellulose |  |  |  | NBKP | Bagasse | NBKP | NBKP | NBKP | NBKP |
| Dispersion | Dispersion Solvent |  |  |  | MEK | MEK | MEK | toluene | toluene | toluene |
|  | Dispersion Stability |  |  |  | A | A | A | A | A | A |
|  | Average Fiber Size in Dispersion, nm |  |  |  | 48 | 52 | 56 | 43 | 24 | 20 |
|  | Viscosity at 25° C., mPa·s |  |  |  | 458 | 3,799 | 555 | 311 | 609 | 1,290 |
|  | 0.5 wt % Transmittance, % |  |  |  | 63 | 69 | 69 | 53 | 82 | 70 |

|  |  |  |  |  | Comp. Ex. 3 | Ex. 15 | Ex. 16 | Ex. 2 | Ex. 17 |
|---|---|---|---|---|---|---|---|---|---|
| Preparation | Ex. No. of Modified Cellulose Fibers |  |  |  | 23 | 13 | 14 | 2 | 15 |
| Modified Cellulose Fibers | Substituent (A) | Formula (1) | $R_1$: C3-30 |  | — | — | — | — | — |
|  |  |  | Reaction Rate (per AGU) |  | — | — | — | — | — |
|  |  |  | Introduction Ratio, Degree of Molar Substitution |  | — | — | — | — | — |
|  |  | Formula (2) | $R_1$: C3-30 |  | —$CH_3$ | —$C_8H_{17}$ | —$C_{12}H_{25}$ | —$C_{18}H_{37}$ | —$C_{18}H_{37}$ |
|  |  |  | n: 0-50 |  | 0 | 0 | 13 | 0 | 0 |
|  |  |  | A: C1-6 |  | — | — | —$OC_2H_4$— | — | — |
|  |  |  | Reaction Rate, per AGU |  | 0.6 | 5.0 | 5.0 | 6.0 | 6.0 |
|  |  |  | Introduction Ratio, Degree of Molar Substitution |  | 0.17 | 0.19 | 0.21 | 0.33 | 0.32 |

TABLE 2-continued

|  |  |  |  |  |  |  |  |  |
|---|---|---|---|---|---|---|---|---|
|  | Substituent (B) | Formula (3) | $R_2$: C1-2 | —$CH_3$ | —$CH_3$ | —$CH_3$ | —$CH_3$ | —$C_2H_5$ |
|  |  |  | Reaction Rate, per AGU | 0.8 | 0.8 | 0.8 | 0.8 | 1.2 |
|  |  |  | Introduction Ratio, Degree of Molar Substitution | 0.06 | 0.06 | 0.06 | 0.06 | 0.08 |
|  | Embodiment of Introducing Substituents |  |  | II | II | II | II | II |
|  | Average Fiber Size, μm |  |  | 24 | 24 | 23 | 23 | 24 |
|  | Cellulose Crystal Form |  |  | I | I | I | I | I |
|  | Crystallinity, % |  |  | 45 | 47 | 45 | 48 | 50 |
|  | Raw Material Cellulose |  |  | NBKP | NBKP | NBKP | NBKP | NBKP |
| Dispersion | Dispersion Solvent |  |  | toluene | toluene | toluene | toluene | toluene |
|  | Dispersion Stability |  |  | C | A | A | A | A |
|  | Average Fiber Size in Dispersion, nm |  |  | >10,000 | 26 | 22 | 20 | 19 |
|  | Viscosity at 25° C., mPa · s |  |  | N.D. | 627 | 1,010 | 4,205 | 3,912 |
|  | 0.5 wt % Transmittance, % |  |  | 3 | 63 | 66 | 72 | 73 |

TABLE 3

|  |  |  |  |  | Ex. 2 | Ex. 18 | Ex. 19 | Ex. 20 | Ex. 21 | Ex. 22 |
|---|---|---|---|---|---|---|---|---|---|---|
| Preparation | Ex. No. of Modified Cellulose Fibers |  |  |  | 2 | 16 | 17 | 18 | 19 | 20 |
| Modified Cellulose Fibers | Substituent (A) | Formula (1) | $R_1$: C3-30 |  | — | — | — | — | — | — |
|  |  |  | Reaction Rate, per AGU |  | — | — | — | — | — | — |
|  |  |  | Introduction Ratio, Degree of Molar Substitution |  | — | — | — | — | — | — |
|  |  | Formula (2) | $R_1$: C3-30 |  | —$C_{18}H_{37}$ | —$C_{18}H_{37}$ | —$C_{18}H_{37}$ | —$C_{18}H_{37}$ | —$C_{18}H_{37}$ | —$C_{18}H_{37}$ |
|  |  |  | n: 0-50 |  | 0 | 0 | 0 | 0 | 0 | 0 |
|  |  |  | A: C1-6 |  | — | — | — | — | — | — |
|  |  |  | Reaction Rate, per AGU |  | 6.0 | 6.0 | 6.0 | 6.0 | 6.0 | 6.0 |
|  |  |  | Introduction Ratio, Degree of Molar Substitution |  | 0.33 | 0.33 | 0.36 | 0.40 | 0.38 | 0.35 |
|  | Substituent (B) | Formula (3) | $R_2$: C1-2 |  | —$CH_3$ | —$CH_3$ | —$CH_3$ | —$CH_3$ | —$CH_3$ | —$CH_3$ |
|  |  |  | Reaction Rate, per AGU |  | 0.8 | 0.8 | 0.8 | 0.8 | 0.8 | 0.8 |
|  |  |  | Introduction Ratio, Degree of Molar Substitution |  | 0.06 | 0.06 | 0.08 | 0.08 | 0.09 | 0.07 |
|  | Embodiment of Introducing Substituents |  |  |  | II | II | II | II | II | II |
|  | Average Fiber Size, μm |  |  |  | 23 | 24 | 28 | 65 | 25 | <0.1 |
|  | Cellulose Crystal Form |  |  |  | I | I | I | I | I | I |
|  | Crystallinity, % |  |  |  | 48 | 55 | 40 | 50 | 31 | 39 |
|  | Raw Material Cellulose |  |  |  | NBKP | LBKP | HYP | ARBOCEL | Powdery Cellulose | MFC |
| Dispersion | Dispersion Solvent |  |  |  | toluene | toluene | toluene | toluene | toluene | toluene |
|  | Dispersion Stability |  |  |  | A | A | A | A | A | A |
|  | Average Fiber Size in Dispersion, nm |  |  |  | 20 | 18 | 11 | 10 | 15 | 48 |
|  | Viscosity at 25° C., mPa · s |  |  |  | 4,205 | 4,006 | 2,945 | 1,850 | 1,664 | 823 |
|  | 0.5 wt % Transmittance, % |  |  |  | 72 | 70 | 65 | 82 | 66 | 55 |

Example 23<Preparation Example of Composite of Acrylic Resin>

The amount 0.25 g of modified cellulose fibers having two kinds of substituents obtained in Example 1 were supplied to 49.75 g of toluene, and the mixture was subjected to the same dispersion treatments as in Example 1, to provide a fine modified cellulose dispersion in which finely fibrillated modified cellulose fibers having two kinds of substituents were dispersed in toluene, a solid content concentration of which was 0.5% by mass. Twenty grams of the dispersion and 2.0 g of an urethane acrylate resin UV-3310B manufactured by The Nippon Synthetic Chemical Industry Co., Ltd. were mixed, and the mixture was subjected to a finely fibrillating treatment with a high-pressure homogenizer by carrying out a 1-pass treatment at 60 MPa, and a 1-pass treatment at 100 MPa. As a photopolymerization initiator, 0.08 g of 1-hydroxy-cyclohexyl-phenyl-ketone manufactured by Wako Pure Chemical Industries, Ltd. was added thereto, and the contents were agitated for 7 minutes with a planetary centrifugal agitator Awatori Rentaro manufactured by THINKY CORPORATION. The varnish obtained was applied in a coating thickness of 2 mm with a bar coater. The coating was dried at 80° C. for 120 minutes, to remove the solvent, and irradiated with a UV irradiation apparatus Light Hammer 10, manufactured by Fusion Systems Japan, at 200 mJ/cm$^2$ to photo-cure, to produce a sheet-like composite material molded article having a thickness of about 0.1 mm, containing 5% by mass of fine modified cellulose fibers, based on the acrylic resin.

Examples 24 to 43 and Comparative Examples 4 to 5<Preparation Examples of Composites of Acrylic Resin>

The same treatments as in Example 23 were carried out except that the modified cellulose fibers used were changed to the modified cellulose fibers listed in Tables 4 to 6, to produce a sheet-like composite material molded article having a thickness of about 0.1 mm, containing 5% by mass of fine modified cellulose fibers, based on the acrylic resin.

Referential Example 1<Acrylic Resin Blank>

The same treatments as in Example 23 were carried out except that 10 mL of toluene was used in place of the modified cellulose fiber dispersion, and that a coating thickness was changed to 0.5 mm, to produce a sheet-like acrylic resin molded article having a thickness of about 0.1 mm.

Example 44<Preparation Example of Composite of Epoxy Resin>

The amount 0.25 g of modified cellulose fibers having two kinds of substituents obtained in Example 2 were supplied to 49.75 g of MEK, and the mixture was subjected to the same dispersion treatments as in Example 1, to provide a fine modified cellulose dispersion in which finely fibrillated modified cellulose fibers were dispersed in MEK, a solid content concentration of which was 0.5% by mass. Twenty five grams of the dispersion and 2.5 g of an epoxy resin jER828 manufactured by Mitsubishi Chemical Co., Ltd. were mixed, and the mixture was subjected to a finely fibrillating treatment with a high-pressure homogenizer by carrying out a 1-pass treatment at 60 MPa, and a 1-pass treatment at 100 MPa. To the solution obtained was added 0.4 g of a curing agent 2-ethyl-4-methylimidazole manufactured by Wako Pure Chemical Industries, Ltd., and agitated for 7 minutes with a planetary centrifugal agitator Awatori Rentaro. The varnish obtained was applied in a coating thickness of 2 mm with a bar coater. The coating was dried at 100° C. for 1 hour, to remove the solvent, and then thermally cured at 150° C. for 2 hours, to produce a sheet-like composite material molded article having a thickness of about 0.2 mm, containing 5% by mass of fine modified cellulose fibers, based on the epoxy resin.

Referential Example 2<Epoxy Resin Blank>

The same treatments as in Example 44 were carried out except that 10 mL of MEK was used in place of the modified cellulose fiber dispersion, and that a coating thickness was changed to 0.5 mm, to produce a sheet-like epoxy resin molded article having a thickness of about 0.2 mm.

Example 45<Preparation Example of Composite of Polystyrene Resin>

The amount 0.50 g of modified cellulose fibers having two kinds of substituents obtained in Example 2 were supplied to 49.50 g of MEK, and the mixture was stirred with a homogenizer at 3,000 rpm for 30 minutes, and thereafter subjected to a 10-pass treatment with a high-pressure homogenizer at 100 MPa, to provide a fine modified cellulose dispersion in which finely fibrillated modified cellulose fibers were dispersed in MEK, a solid content concentration of which was 1.0% by mass. The amount 7.5 g of the dispersion, 1.5 g of a polystyrene resin manufactured by Sigma-Aldrich, number-average molecular weight: 170,000, Product Number: 441147-1KG, and 30 g of MEK were mixed, and stirred with a magnetic stirrer at room temperature and 1,500 rpm for 12 hours. Thereafter, the mixture was subjected to a finely fibrillating treatment with a high-pressure homogenizer by carrying out a 1-pass treatment at 60 MPa and a 1-pass treatment at 100 MPa. Thereafter, the mixture was agitated for 7 minutes with a planetary centrifugal agitator Awatori Rentaro. The varnish obtained was supplied to a glass petri dish having a diameter of 9 cm, and dried at 100° C. for 12 hours to remove the solvent, to produce a sheet-like composite material molded article having a thickness of about 0.2 mm, containing 5% by mass of fine modified cellulose fibers, based on the polystyrene resin.

Referential Example 3<Polystyrene Resin Blank>

The same treatments as in Example 45 were carried out except that 15 g of MEK was used in place of the modified cellulose fiber dispersion, to produce a sheet-like polystyrene resin molded article having a thickness of about 0.2 mm.

Example 46<Preparation Example of Composite of Polyethylene Resin>

Eighty grams of a polyethylene manufactured by Japan Polyethylene Corporation, under the trade name of Novatec LL UF641 and 8.0 g of the modified cellulose fibers having two kinds of substituents obtained in Example 2 were sequentially added, and the mixture was kneaded with a kneader Labo-plasto mill, manufactured by TOYO SEIKI SEISAKU-SHO, at a rotational speed of 50 rpm, at 240° C. for 8 minutes, to provide a homogeneous mixture. The homogeneous mixture was sequentially pressed with a pressing machine "Labo-press" manufactured by TOYO SEIKI SEISAKU-SHO under conditions of 240° C., 0.4 MPa for 1 minute, 20 MPa for 1 minutes, and then at 80° C., 0.4 MPa for 1 minute, to produce a sheet-like composite material molded article having a thickness of about 0.4 mm, containing 10% by mass of modified cellulose fibers, based on the polyethylene resin.

Referential Example 4<Polyethylene Blank>

The same treatments as in Example 46 were carried out except that the modified cellulose fibers were not used, to produce a sheet-like polyethylene resin molded article having a thickness of about 0.4 mm.

Example 47<Preparation Example of Composite of Rubber-Based Resin (Casting Method)>

The amount 0.50 g of modified cellulose fibers having two kinds of substituents obtained in Example 2 were supplied to 49.50 g of toluene, and the mixture was stirred with a homogenizer T.K. ROBOMICS manufactured by PRIMIX Corporation at 3,000 rpm for 30 minutes, and thereafter subjected to a 10-pass treatment with a high-pressure homogenizer "NanoVater L-ES" manufactured by YOSHIDA KIKAI CO., LTD. at 100 MPa, to provide a fine modified cellulose dispersion in which finely fibrillated modified cellulose fibers were dispersed in toluene, a solid content concentration of which was 1.0% by mass. Ten grams of the dispersion, 2.0 g of a styrene-butadiene copolymer SBR, 0.04 g of stearic acid, 0.06 g of zinc oxide, 0.03 g of sulfur, 0.01 g of (N-(tert-butyl)-2-benzothiazolyl sulfenamine (TBBS), 0.01 g of di-2-benzothiazolyl disulfide (MBTS), 0.01 g of 1,3-diphenyl guanidine (DPG) and 30 g of toluene were mixed, and the mixture was stirred at room temperature of 25° C. for 2 hours. After having confirmed of dissolution, the solution obtained was subjected to a finely fibrillating treatment of a 1-pass treatment at 60 MPa and a 1-pass treatment at 100 MPa with a high-pressure homogenizer. The dispersion obtained was poured to a glass petri dish having a diameter of 9 cm and kept at room temperature and an ambient pressure for 2 days, to remove toluene. Thereafter, the dispersion was dried at room temperature for 12 hours with a vacuum drier, and the dried product was subjected to vulcanization at 150° C. for 1 hour, to provide a vulcanized rubber sheet having a thickness of about 0.2 mm.

Examples 48 to 51<Preparation Examples of Composites of Rubber-Based Resin (Casting Method)>

The same treatments as in Example 47 were carried out except that the modified cellulose fibers used and a blending component were changed to those listed in Table 10, to provide a vulcanized rubber sheet having a thickness of about 0.2 mm, containing from 1 to 10% by mass of fine modified cellulose fibers, based on the rubber-based resin.

Referential Example 5<SBR Blank (Casting Method)>

The same treatments as in Example 47 were carried out except that the modified cellulose fibers were not used, to provide a vulcanized rubber sheet having a thickness of about 0.2 mm.

Example 52<Preparation Example of Composite of Rubber-Based Resin (Kneading Method)>

Using modified cellulose fibers having two kinds of substituents obtained in Example 1, a rubber composition was produced. A styrene-butadiene copolymer SBR was used as a rubber. Components excluding a vulcanization accelerator and sulfur in a blending component listed in Table 11 were kneaded for 6 minutes with a 50-milliliter tightly closed-type mixer, and the vessel was opened when the temperature reached 150° C., to provide a rubber composition (the kneading step A). To the rubber composition were added vulcanization accelerators (TBBS, MBTS, DPG, and zinc oxide) and sulfur, the contents were kneaded for 3 minutes with a 50-milliliter tightly closed-type mixer, and the vessel was opened when the temperature reached 100° C., to provide an unvulcanized rubber composition (the kneading step B). The rubber composition obtained was subjected to vulcanization treatment in a die having dimensions of 15×15×0.2 cm at 145° C. for 20 minutes, to provide a vulcanized rubber sheet having a thickness of about 0.2 mm.

Examples 53 to 73 and Comparative Example 6<Preparation Examples of Composite of Rubber-Based Resin (Kneading Method)>

The same treatments as in Example 52 were carried out except that the modified cellulose fibers used and various blending components were changed to those listed in Tables 11 to 14, to provide a vulcanized rubber sheet having a thickness of about 0.2 mm, containing from 1 to 10% by mass of fine modified cellulose fibers, based on the rubber-based resin.

Example 74<Preparation Example of Composite of Rubber-Based Resin (Kneading Method)>

The same treatments as in Example 73 were carried out except that the modified cellulose fibers used were changed with a product of the modified cellulose fibers prepared in Example 3 pulverized with a batch-type vibrating mill "MB-1" manufactured by CHUO KAKOHKI CO., LTD, having a reactor entire volume of 3.5 L, using 13 rods made of SUS304 having a diameter φ of 30 mm, a length of 218 mm, a cross-sectional shape of circular, a rod filling ratio of 57%, treatment time of 20 minutes, and an initial sample charging of 100 g, to provide a vulcanized rubber sheet having a thickness of about 0.2 mm.

Example 75<Preparation Example of Composite of Rubber-Based Resin (Kneading Method)>

The same treatments as in Example 73 were carried out except that the modified cellulose fibers used were changed to a product pulverized with a batch-type vibrating mill of the modified cellulose fibers prepared in Example 3 (prepared in the same manner as Example 74), and that a step of further kneading the rubber composition obtained in the kneading step A for 6 minutes with a tightly closed type mixer between the kneading step A and the kneading step B, and opening the vessel when the temperature reached 150° C. to provide a rubber composition (the kneading step C) was added, to provide a vulcanized rubber sheet having a thickness of about 0.2 mm.

Example 76<Preparation Example of Composite of Rubber-Based Resin (Kneading Method)>

The same treatments as in Example 73 were carried out except that the modified cellulose fibers used were changed to a product pulverized with a batch-type vibrating mill of the modified cellulose fibers prepared in Example 3 (in the same manner as Example 74 except that 50 g of initial sample charging and 25 g of ion-exchanged water as a pulverization aid were further added to carry out the treatments), to provide a vulcanized rubber sheet having a thickness of about 0.2 mm.

Example 77<Preparation Example of Composite of Rubber-Based Resin (Kneading Method)>

The same treatments as in Example 73 were carried out except that the modified cellulose fibers used were changed to a product pulverized with a batch-type vibrating mill of the modified cellulose fibers prepared in Example 3 (prepared in the same manner as Example 76), and a step of further kneading the rubber composition obtained in the kneading step A for 6 minutes with a tightly closed type mixer between the kneading step A and the kneading step B, and opening the vessel when the temperature reached 150° C. to provide a rubber composition (kneading step C) was added, to provide a vulcanized rubber sheet having a thickness of about 0.2 mm.

Example 78<Preparation Example of Composite of Rubber-Based Resin (Kneading Method)>

The same treatments as in Example 73 were carried out except that as a compatibilizing agent 2 parts by mass of OREVAC OE808 manufactured by ARKEMA were further added based on 100 parts by mass of SBR during the kneading step A, to provide a vulcanized rubber sheet having a thickness of about 0.2 mm.

Example 79<Preparation Example of Composite of Rubber-Based Resin (Kneading Method)>

The same treatments as in Example 73 were carried out except that as a silane coupling agent 2 parts by mass of Si69 manufactured by Evonik Industries were further added based on 100 parts by mass of SBR during the kneading step A, to provide a vulcanized rubber sheet having a thickness of about 0.2 mm.

Example 80<Preparation Example of Composite of Rubber-Based Resin (Kneading Method)>

The same treatments as in Example 73 were carried out except that the rubber used was changed to natural rubber, No.: RSS3 (NR), to provide a vulcanized rubber sheet having a thickness of about 0.2 mm.

Example 81<Preparation Example of Composite of Rubber-Based Resin (Kneading Method)>

The same treatments as in Example 80 were carried out except that the amount of carbon black blended was changed to a component listed in Table 15, to provide a vulcanized rubber sheet having a thickness of about 0.2 mm.

Example 82<Preparation Example of Composite of Rubber-Based Resin (Kneading Method)>

The same treatments as in Example 81 were carried out except that the modified cellulose fibers used were changed to a product pulverized with a batch-type vibrating mill of the modified cellulose fibers prepared in Example 3 (the same treatments as in Example 74), to provide a vulcanized rubber sheet having a thickness of about 0.2 mm.

Example 83<Preparation Example of Composite of Rubber-Based Resin (Kneading Method)>

The same treatments as in Example 81 were carried out except that the modified cellulose fibers used were changed to a product pulverized with a batch-type vibrating mill of the modified cellulose fibers prepared in Example 3 (the same treatments as in Example 76), to provide a vulcanized rubber sheet having a thickness of about 0.2 mm.

Example 84<Preparation Example of Composite of Rubber-Based Resin (Kneading Method)>

The same treatments as in Example 81 were carried out except that the modified cellulose fibers used were changed to a product pulverized with a batch-type vibrating mill of the modified cellulose fibers prepared in Example 3 (the same treatments as in Example 76), and that a step of kneading for 6 minutes with a tightly closed type mixer between the kneading step A and the kneading step B, and opening the vessel when the temperature reached 150° C. to provide a rubber composition (the kneading step C) was added, to provide a vulcanized rubber sheet having a thickness of about 0.2 mm.

Referential Example 6<SBR Blank (Kneading Method)>

The same treatments as in Example 52 were carried out except that the modified cellulose fibers were not used, to provide a vulcanized rubber sheet having a thickness of about 0.2 mm.

Referential Example 7<Carbon Black-Added SBR Blank (Kneading Method)>

The same treatments as in Example 72 were carried out except that the modified cellulose fibers were not used, to provide a vulcanized rubber sheet having a thickness of about 0.2 mm.

Referential Example 8<NR Blank (Kneading Method)>

The same treatments as in Example 80 were carried out except that the modified cellulose fibers were not used, to provide a vulcanized rubber sheet having a thickness of about 0.2 mm.

Referential Example 9<Carbon Black-Added NR Blank (Kneading Method)>

The same treatments as in Example 81 were carried out except that the modified cellulose fibers were not used, to provide a vulcanized rubber sheet having a thickness of about 0.2 mm.

Each of the properties of the molded article obtained was evaluated in accordance with the methods of the following Test Examples 8 to 12. The results are shown in Tables 4 to 15.

Test Example 8—Storage Modulus

Using a dynamic viscoelastometer "DMS6100," manufactured by SII, the storage modulus of a rectangular sample cut out to have a width of 5 mm and a length of 20 mm from the molded article obtained was measured in tensile mode while raising the temperature from −50° C. to 200° C. in a rate of 2° C. per minute under a nitrogen atmosphere at a frequency of 1 Hz. The storage modulus listed in the tables is a value at a temperature shown in parenthesis, and the higher the storage moduli (MPa), the more excellent the strength, so that it is shown that the higher the strength at high temperatures, the more excellent the heat resistance.

Test Example 9—Coefficient of Linear Thermal Expansion (CTE)

Using a thermal stress-strain measurement apparatus "EXSTAR TMA/SS6100" manufactured by Seiko Instruments, Inc., the measurements were taken with a rectangular sample having a width of 3 mm and a length of 20 mm, which was subjected to temperature elevation at a rate of 5° C. per minute under a nitrogen atmosphere in a tensile mode, with applying a load of 25 g. The coefficient of linear thermal expansion (CTE) was obtained by calculating an average coefficient of linear thermal expansion within a given temperature range. The number within the parenthesis listed in the tables shows a temperature range used in the calculation, and it is shown that the lower the CTE, the more excellent the dimensional stability.

Test Example 10—Tensile Modulus

In a thermostatic chamber at 25° C., a tensile modulus of a molded article was measured in accordance with a tensile test with a tensile compression tester "Autograph AGS-X" manufactured by SHIMADZU Corporation, as prescribed in JIS K7113. Samples punched through with No. 2 dumbbell were set apart with a span of 80 mm at a crosshead speed of 10 mm/min. It is shown that the higher the tensile moduli, the more excellent the mechanical strength.

Test Example 11—Relative Storage Modulus

Using a dynamic viscoelastometer "DMS6100," manufactured by SII, the storage modulus and tan δ of a rectangular sample cut out to have a width of 5 mm and a length of 20 mm from the sheet obtained were measured in tensile mode while raising the temperature from −50° C. to 200° C. in a rate of 2° C. per minute in a nitrogen atmosphere at a frequency of 1 Hz. When values of Referential Examples were considered as 100, relative modulus and relative tan δ were calculated from the storage modulus and tan δ obtained. It is shown that the higher the relative storage moduli to the value of the corresponding Referential Examples, the more excellent the strength. In addition, it is shown that the lower the relative tan δ to the value of the corresponding Referential Examples, the lower the thermal conversion of energy during the transformation and the more excellent the reduced energy loss.

Test Example 12—Relative Coefficient of Linear Thermal Expansion (Relative CTE)

Using a thermal stress-strain measurement apparatus "EXSTAR TMA/SS6100" manufactured by Seiko Instruments, Inc., the measurements were taken with a rectangular sample having a width of 3 mm and a length of 20 mm, which was subjected to temperature elevation at a rate of 5° C. per minute under nitrogen atmosphere in a tensile mode, with applying a load of 50 g. As a coefficient of linear thermal expansion (CTE), a value measured at 80° C. was used. When the CTEs of Referential Examples were considered as 100, relative CTE was calculated from the CTE obtained. It is shown that the lower the relative CTE to the CTE of the corresponding Referential Examples, the more excellent the dimensional stability.

TABLE 4

Acrylic Resin: Solution Mixing - Cast Molding

| | | | | | Ex. 23 | Ex. 24 | Ex. 25 | Ex. 26 | Ex. 27 |
|---|---|---|---|---|---|---|---|---|---|
| Preparation Modified Cellulose Fibers | Ex. No. of Modified Cellulose Fibers | | | | 1 | 2 | 3 | 4 | 5 |
| | Substituent (A) | Formula (1) | $R_1$: C3-30 | | — | — | — | — | — |
| | | | Introduction Ratio, Degree of Molar Substitution | | — | — | — | — | — |
| | | Formula (2) | $R_1$: C3-30 | | —$C_{18}H_{37}$ | —$C_{18}H_{37}$ | —$C_{18}H_{37}$ | —$C_{18}H_{37}$ | —$C_{18}H_{37}$ |
| | | | n: 0-50 | | 0 | 0 | 0 | 0 | 0 |
| | | | A: C1-6 | | — | — | — | — | — |
| | | | Introduction Ratio, Degree of Molar Substitution | | 0.30 | 0.33 | 0.35 | 0.36 | 0.34 |
| | Substituent (B) | Formula (3) | $R_2$: C1-2 | | —$CH_3$ | —$CH_3$ | —$CH_3$ | —$CH_3$ | —$CH_3$ |
| | | | Introduction Ratio, Degree of Molar Substitution | | 0.03 | 0.06 | 0.14 | 0.41 | 0.66 |
| | Average Fiber Size, μm | | | | 24 | 23 | 24 | 23 | 24 |
| | Cellulose Crystal Form | | | | I | I | I | I | I |
| | Crystallinity, % | | | | 52 | 48 | 48 | 44 | 45 |
| | Raw Material Cellulose | | | | NBKP | NBKP | NBKP | NBKP | NBKP |
| | Content, Based on 100 Parts by Mass of Resin | | | | 5 | 5 | 5 | 5 | 5 |
| Molded Article | Storage Modulus, MPa (150° C.) | | | | 76 | 93 | 94 | 86 | 84 |
| | CTE, ppm/K (50°-100° C.) | | | | 90 | 72 | 76 | 79 | 87 |

| | | | | | Ex. 28 | Ex. 29 | Comp. Ex. 4 | Ref. Ex. 1 |
|---|---|---|---|---|---|---|---|---|
| Preparation Modified Cellulose Fibers | Ex. No. of Modified Cellulose Fibers | | | | 6 | 7 | 21 | — |
| | Substituent (A) | Formula (1) | $R_1$: C3-30 | | — | — | — | — |
| | | | Introduction Ratio, Degree of Molar Substitution | | — | — | — | — |
| | | Formula (2) | $R_1$: C3-30 | | —$C_{18}H_{37}$ | —$C_{18}H_{37}$ | — | — |
| | | | n: 0-50 | | 0 | 0 | — | — |
| | | | A: C1-6 | | — | — | — | — |
| | | | Introduction Ratio, Degree of Molar Substitution | | 0.05 | 0.13 | — | — |
| | Substituent (B) | Formula (3) | $R_2$: C1-2 | | —$CH_3$ | —$CH_3$ | —$CH_3$ | — |
| | | | Introduction Ratio, Degree of Molar Substitution | | 0.06 | 0.06 | 0.41 | — |
| | Average Fiber Size, μm | | | | 24 | 24 | 24 | — |
| | Cellulose Crystal Form | | | | I | I | I | — |
| | Crystallinity, % | | | | 43 | 48 | 53 | — |
| | Raw Material Cellulose | | | | NBKP | NBKP | NBKP | — |
| | Content, Based on 100 Parts by Mass of Resin | | | | 5 | 5 | 5 | — |
| Molded Article | Storage Modulus, MPa (150° C.) | | | | 96 | 95 | 18 | 14 |
| | CTE, ppm/K (50°-100° C.) | | | | 84 | 80 | 190 | 194 |

TABLE 5

Acrylic Resin: Solution Mixing - Cast Molding

| | | | | Ex. 30 | Ex. 31 | Ex. 32 | Ex. 33 | Ex. 34 | Ex. 35 |
|---|---|---|---|---|---|---|---|---|---|
| Preparation Ex. No. of Modified Cellulose Fibers | | | | 8 | 10 | 10 | 10 | 11 | 12 |
| Modified Cellulose Fibers | Substituent (A) | Formula (1) | $R_1$: C3-30 | $-C_4H_9$ | $-C_8H_{17}$ | $-C_8H_{17}$ | $-C_8H_{17}$ | $-C_8H_{17}$ | $-C_{16}H_{33}$ |
| | | | Introduction Ratio, Degree of Molar Substitution | 0.37 | 0.40 | 0.40 | 0.40 | 0.68 | 0.26 |
| | | Formula (2) | $R_1$: C3-30 | — | — | — | — | — | — |
| | | | n: 0-50 | — | — | — | — | — | — |
| | | | A: C1-6 | — | — | — | — | — | — |
| | | | Introduction Ratio, Degree of Molar Substitution | — | — | — | — | — | — |
| | Substituent (B) | Formula (3) | $R_2$: C1-2 | $-CH_3$ | $-CH_3$ | $-CH_3$ | $-CH_3$ | $-CH_3$ | $-CH_3$ |
| | | | Introduction Ratio, Degree of Molar Substitution | 0.06 | 0.35 | 0.35 | 0.35 | 0.06 | 0.06 |
| | Average Fiber Size, μm | | | 24 | 24 | 24 | 24 | 23 | 24 |
| | Cellulose Crystal Form | | | I | I | I | I | I | I |
| | Crystallinity, % | | | 50 | 53 | 53 | 53 | 48 | 52 |
| | Raw Material Cellulose | | | NBKP | NBKP | NBKP | NBKP | NBKP | NBKP |
| | Content, Based on 100 Parts by Mass of Resin | | | 5 | 10 | 5 | 1 | 5 | 5 |
| Molded Article | Storage Modulus, MPa (150° C.) | | | 68 | 98 | 52 | 16 | 76 | 88 |
| | CTE, ppm/K (50°-100° C.) | | | 98 | 86 | 121 | 168 | 95 | 72 |

| | | | | Comp. Ex. 5 | Ex. 36 | Ex. 37 | Ex. 24 | Ex. 38 | Ref. Ex. 1 |
|---|---|---|---|---|---|---|---|---|---|
| Preparation Ex. No. of Modified Cellulose Fibers | | | | 23 | 13 | 14 | 2 | 15 | — |
| Modified Cellulose Fibers | Substituent (A) | Formula (1) | $R_1$: C3-30 | — | — | — | — | — | — |
| | | | Introduction Ratio, Degree of Molar Substitution | — | — | — | — | — | — |
| | | Formula (2) | $R_1$: C3-30 | $-CH_3$ | $-C_8H_{17}$ | $-C_{12}H_{25}$ | $-C_{18}H_{37}$ | $-C_{18}H_{37}$ | — |
| | | | n: 0-50 | 0 | 0 | 13 | 0 | 0 | — |
| | | | A: C1-6 | — | — | $-OC_2H_4-$ | — | — | — |
| | | | Introduction Ratio, Degree of Molar Substitution | 0.17 | 0.19 | 0.21 | 0.33 | 0.32 | — |
| | Substituent (B) | Formula (3) | $R_2$: C1-2 | $-CH_3$ | $-CH_3$ | $-CH_3$ | $-CH_3$ | $-C_2H_5$ | — |
| | | | Introduction Ratio, Degree of Molar Substitution | 0.06 | 0.06 | 0.06 | 0.06 | 0.08 | — |
| | Average Fiber Size, μm | | | 24 | 24 | 23 | 23 | 24 | — |
| | Cellulose Crystal Form | | | I | I | I | I | I | — |
| | Crystallinity, % | | | 45 | 47 | 45 | 48 | 50 | — |
| | Raw Material Cellulose | | | NBKP | NBKP | NBKP | NBKP | NBKP | — |
| | Content, Based on 100 Parts by Mass of Resin | | | 5 | 5 | 5 | 5 | 5 | — |
| Molded Article | Storage Modulus, MPa (150° C.) | | | 17 | 85 | 81 | 93 | 90 | 14 |
| | CTE, ppm/K (50°-100° C.) | | | 182 | 102 | 105 | 72 | 85 | 194 |

TABLE 6

Acrylic Resin: Solution Mixing - Cast Molding

| | | | | Ex. 24 | Ex. 39 | Ex. 40 | Ex. 41 | Ex. 42 | Ex. 43 | Ref. Ex. 1 |
|---|---|---|---|---|---|---|---|---|---|---|
| Preparation Ex. No. of Modified Cellulose Fibers | | | | 2 | 16 | 17 | 18 | 19 | 20 | — |
| Modified Cellulose Fibers | Substituent (A) | Formula (1) | $R_1$: C3-30 | — | — | — | — | — | — | — |
| | | | Introduction Ratio, Degree of Molar Substitution | — | — | — | — | — | — | — |
| | | Formula (2) | $R_1$: C3-30 | $-C_{18}H_{37}$ | $-C_{18}H_{37}$ | $-C_{18}H_{37}$ | $-C_{18}H_{37}$ | $-C_{18}H_{37}$ | $-C_{18}H_{37}$ | — |
| | | | n: 0-50 | 0 | 0 | 0 | 0 | 0 | 0 | — |
| | | | A: C1-6 | — | — | — | — | — | — | — |
| | | | Introduction Ratio, Degree of Molar Substitution | 0.33 | 0.33 | 0.36 | 0.40 | 0.38 | 0.35 | — |
| | Substituent (B) | Formula (3) | $R_2$: C1-2 | $-CH_3$ | $-CH_3$ | $-CH_3$ | $-CH_3$ | $-CH_3$ | $-CH_3$ | — |
| | | | Introduction Ratio, Degree of Molar Substitution | 0.06 | 0.06 | 0.08 | 0.08 | 0.09 | 0.07 | — |

TABLE 6-continued

Acrylic Resin: Solution Mixing - Cast Molding

|  |  | Ex. 24 | Ex. 39 | Ex. 40 | Ex. 41 | Ex. 42 | Ex. 43 | Ref. Ex. 1 |
|---|---|---|---|---|---|---|---|---|
|  | Average Fiber Size, μm | 23 | 24 | 28 | 65 | 25 | <0.1 | — |
|  | Cellulose Crystal Form | I | I | I | I | I | I | — |
|  | Crystallinity, % | 48 | 55 | 40 | 50 | 31 | 39 | — |
|  | Raw Material Cellulose | NBKP | LBKP | HYP | ARBOCEL | Powdery Cellulose | MFC | — |
|  | Content, Based on 100 Parts by Mass of Resin | 5 | 5 | 5 | 5 | 5 | 5 | — |
| Molded Article | Storage Modulus, MPa (150° C.) | 93 | 94 | 94 | 88 | 71 | 54 | 14 |
|  | CTE, ppm/K (50°-100° C.) | 72 | 100 | 93 | 81 | 96 | 117 | 194 |

TABLE 7

Epoxy Resin: Solution Mixing - Cast Molding

|  |  |  |  |  | Ex. 44 | Ref. Ex. 2 |
|---|---|---|---|---|---|---|
| Preparation Ex. No. of Modified Cellulose Fibers |  |  |  |  | 2 | — |
| Modified Cellulose Fibers | Substituent (A) | Formula (1) | $R_1$: C3-30 | Introduction Ratio, Degree of Molar Substitution | — | — |
|  |  | Formula (2) | $R_1$: C3-30 | | $-C_{18}H_{37}$ | — |
|  |  |  | n: 0-50 | | 0 | — |
|  |  |  | A: C1-6 | | — | — |
|  |  |  |  | Introduction Ratio, Degree of Molar Substitution | 0.33 | — |
|  | Substituent (B) | Formula (3) | $R_2$: C1-2 | | $-CH_3$ | — |
|  |  |  |  | Introduction Ratio, Degree of Molar Substitution | 0.06 | — |
|  | Average Fiber Size, μm |  |  |  | 23 | — |
|  | Cellulose Crystal Form |  |  |  | I | — |
|  | Crystallinity, % |  |  |  | 48 | — |
|  | Raw Material Cellulose |  |  |  | NBKP | — |
|  | Content, Based on 100 Parts by Mass of Resin |  |  |  | 5 | — |
| Molded Article | Storage Modulus, MPa (200° C.) |  |  |  | 155 | 118 |
|  | CTE, ppm/K (150°-180° C.) |  |  |  | 121 | 183 |

TABLE 8

Polystyrene Resin: Solution Mixing - Cast Molding

|  |  |  |  |  | Ex. 45 | Ref. Ex. 3 |
|---|---|---|---|---|---|---|
| Preparation Ex. No. of Modified Cellulose Fibers |  |  |  |  | 2 | — |
| Modified Cellulose Fibers | Substituent (A) | Formula (1) | $R_1$: C3-30 | Introduction Ratio, Degree of Molar Substitution | — | — |
|  |  | Formula (2) | $R_1$: C3-30 | | $-C_{18}H_{37}$ | — |
|  |  |  | n: 0-50 | | 0 | — |
|  |  |  | A: C1-6 | | — | — |
|  |  |  |  | Introduction Ratio, Degree of Molar Substitution | 0.33 | — |
|  | Substituent (B) | Formula (3) | $R_2$: C1-2 | | $-CH_3$ | — |
|  |  |  |  | Introduction Ratio, Degree of Molar Substitution | 0.06 | — |
|  | Average Fiber Size, μm |  |  |  | 23 | — |
|  | Cellulose Crystal Form |  |  |  | I | — |
|  | Crystallinity, % |  |  |  | 48 | — |
|  | Raw Material Cellulose |  |  |  | NBKP | — |
|  | Content, Based on 100 Parts by Mass of Resin |  |  |  | 5 | — |
| Molded Article | Storage Modulus, MPa (120° C.) |  |  |  | 102 | 0.12 |
|  | CTE, ppm/K (105°-110° C.) |  |  |  | 65 | 19,315 |

TABLE 9

Polyethylene Resin: Melt-Blending - Heat Press Molding

|  |  |  |  |  | Ex. 46 | Ref. Ex. 4 |
|---|---|---|---|---|---|---|
| Preparation Ex. No. of Modified Cellulose Fibers |  |  |  |  | 2 | — |
| Modified Cellulose Fibers | Substituent (A) | Formula (1) | $R_1$: C3-30 | Introduction Ratio, Degree of Molar Substitution | — | — |
|  |  | Formula (2) | $R_1$: C3-30 | | $-C_{18}H_{37}$ | — |
|  |  |  | n: 0-50 | | 0 | — |
|  |  |  | A: C1-6 | | — | — |
|  |  |  |  | Introduction Ratio, Degree of Molar Substitution | 0.33 | — |
|  | Substituent (B) | Formula (3) | $R_2$: C1-2 | | $-CH_3$ | — |
|  |  |  |  | Introduction Ratio, Degree of Molar Substitution | 0.06 | — |
|  | Average Fiber Size, μm |  |  |  | 23 | — |
|  | Cellulose Crystal Form |  |  |  | I | — |
|  | Crystallinity, % |  |  |  | 48 | — |
|  | Raw Material Cellulose |  |  |  | NBKP | — |
|  | Content, Based on 100 Parts by Mass of Resin |  |  |  | 5 | — |
| Molded Article | Storage Modulus, MPa |  |  |  | −710 | 394 |

TABLE 10

Rubber-Based Resin: Casting Method

| | | | | Ex. 47 | Ex. 48 | Ex. 49 | Ex. 50 | Ex. 51 | Ref. Ex. 5 |
|---|---|---|---|---|---|---|---|---|---|
| Preparation Ex. No. of Modified Cellulose Fibers | | | | 2 | 12 | 10 | 10 | 10 | — |
| Modified Cellulose Fibers | Substituent (A) | Formula (1) | $R_1$: C3-30 | — | $-C_{16}H_{33}$ | $-C_8H_{17}$ | $-C_8H_{17}$ | $-C_8H_{17}$ | — |
| | | | Introduction Ratio, Degree of Molar Substitution | — | 0.26 | 0.40 | 0.40 | 0.40 | — |
| | | Formula (2) | $R_1$: C3-30 | $-C_{18}H_{37}$ | — | — | — | — | — |
| | | | n: 0-50 | 0 | — | — | — | — | — |
| | | | A: C1-6 | — | — | — | — | — | — |
| | | | Introduction Ratio, Degree of Molar Substitution | 0.33 | — | — | — | — | — |
| | Substituent (B) | Formula (3) | $R_2$: C1-2 | $-CH_3$ | $-CH_3$ | $-CH_3$ | $-CH_3$ | $-CH_3$ | — |
| | | | Introduction Ratio, Degree of Molar Substitution | 0.06 | 0.06 | 0.35 | 0.35 | 0.35 | — |
| | Average Fiber Size, μm | | | 23 | 24 | 24 | 24 | 24 | — |
| | Cellulose Crystal Form | | | I | I | I | I | I | — |
| | Crystallinity, % | | | 48 | 52 | 53 | 53 | 53 | — |
| | Raw Material Cellulose | | | NBKP | NBKP | NBKP | NBKP | NBKP | — |
| Components of Molded Article | Modified Cellulose Fibers, Parts by Mass | | | 5 | 5 | 10 | 5 | 1 | 0 |
| | SBR, Parts by Mass | | | 100 | 100 | 100 | 100 | 100 | 100 |
| | Carbon Black, Parts by Mass | | | 0 | 0 | 0 | 0 | 0 | 0 |
| | Stearic Acid, Parts by Mass | | | 2 | 2 | 2 | 2 | 2 | 2 |
| | Zinc Oxide, Parts by Mass | | | 3 | 3 | 3 | 3 | 3 | 3 |
| | Sulfur, Parts by Mass | | | 1.5 | 1.5 | 1.5 | 1.5 | 1.5 | 1.5 |
| | Vulcanization Accelerator TBBS, Parts by Mass | | | 0.5 | 0.5 | 0.5 | 0.5 | 0.5 | 0.5 |
| | Vulcanization Accelerator MBTS, Parts by Mass | | | 0.5 | 0.5 | 0.5 | 0.5 | 0.5 | 0.5 |
| | Vulcanization Accelerator DPG, Parts by Mass | | | 0.5 | 0.5 | 0.5 | 0.5 | 0.5 | 0.5 |
| Evaluation Results | Relative Storage Modulus at 80° C., Based on Ref. Ex. 5 | | | 4,154 | 4,059 | 13,645 | 2,564 | 655 | 100 |
| | Relative CTE at 80° C., Based on Ref. Ex. 5 | | | 20 | 19 | 20 | 28 | 64 | 100 |

TABLE 11

Rubber-Based Resin: Kneading Method

| | | | | Ex. 52 | Ex. 53 | Ex. 54 | Ex. 55 | Ex. 56 | Ex. 57 | Ref. Ex. 6 | Ref. Ex. 7 |
|---|---|---|---|---|---|---|---|---|---|---|---|
| Preparation Ex. No. of Modified Cellulose Fibers | | | | 1 | 2 | 3 | 4 | 5 | 6 | — | — |
| Modified Cellulose Fibers | Substituent (A) | Formula (1) | $R_1$: C3-30 | — | — | — | — | — | — | — | — |
| | | | Introduction Ratio, Degree of Molar Substitution | — | — | — | — | — | — | — | — |
| | | Formula (2) | $R_1$: C3-30 | $-C_{18}H_{37}$ | $-C_{18}H_{37}$ | $-C_{18}H_{37}$ | $-C_{18}H_{37}$ | $-C_{18}H_{37}$ | $-C_{18}H_{37}$ | — | — |
| | | | n: 0-50 | 0 | 0 | 0 | 0 | 0 | 0 | — | — |
| | | | A: C1-6 | — | — | — | — | — | — | — | — |
| | | | Introduction Ratio, Degree of Molar Substitution | 0.30 | 0.33 | 0.35 | 0.36 | 0.34 | 0.05 | — | — |
| | Substituent (B) | Formula (3) | $R_2$: C1-2 | $-CH_3$ | $-CH_3$ | $-CH_3$ | $-CH_3$ | $-CH_3$ | $-CH_3$ | — | — |
| | | | Introduction Ratio, Degree of Molar Substitution | 0.03 | 0.06 | 0.14 | 0.41 | 0.66 | 0.06 | — | — |
| | Average Fiber Size, μm | | | 24 | 23 | 24 | 23 | 24 | 24 | — | — |
| | Cellulose Crystal Form | | | I | I | I | I | I | I | — | — |
| | Crystallinity, % | | | 52 | 48 | 48 | 44 | 45 | 43 | — | — |
| | Raw Material Cellulose | | | NBKP | NBKP | NBKP | NBKP | NBKP | NBKP | — | — |
| Component of Molded Article | Modified Cellulose Fibers, Parts by Mass | | | 10 | 10 | 10 | 10 | 10 | 10 | — | — |
| | SBR, Parts by Mass | | | 100 | 100 | 100 | 100 | 100 | 100 | 100 | 100 |
| | Carbon Black, Parts by Mass | | | 0 | 0 | 0 | 0 | 0 | 0 | 0 | 50 |
| | Stearic Acid, Parts by Mass | | | 2 | 2 | 2 | 2 | 2 | 2 | 2 | 2 |
| | Zinc Oxide, Parts by Mass | | | 3 | 3 | 3 | 3 | 3 | 3 | 3 | 3 |
| | Sulfur, Parts by Mass | | | 1.5 | 1.5 | 1.5 | 1.5 | 1.5 | 1.5 | 1.5 | 1.5 |
| | Vulcanization Accelerator TBBS, Parts by Mass | | | 0.5 | 0.5 | 0.5 | 0.5 | 0.5 | 0.5 | 0.5 | 0.5 |
| | Vulcanization Accelerator MBTS, Parts by Mass | | | 0.5 | 0.5 | 0.5 | 0.5 | 0.5 | 0.5 | 0.5 | 0.5 |
| | Vulcanization Accelerator DPG, Parts by Mass | | | 0.5 | 0.5 | 0.5 | 0.5 | 0.5 | 0.5 | 0.5 | 0.5 |
| Evaluation Results | Relative Storage Modulus at 25° C., Based on Ref. Ex. 6 | | | 1,805 | 2,860 | 3,180 | 2,900 | 2,375 | 2,360 | 100 | 795 |
| | Relative tan δ at 25° C., Based on Ref. Ex. 6 | | | 60 | 59 | 60 | 58 | 60 | 55 | 100 | 82 |

TABLE 12

Rubber-Based Resin: Kneading Method

| | | | | Ex. 58 | Ex. 59 | Ex. 60 | Ex. 61 | Comp. Ex. 6 | Ex. 62 |
|---|---|---|---|---|---|---|---|---|---|
| Preparation Ex. No. of Modified Cellulose Fibers | | | | 8 | 10 | 11 | 12 | 23 | 13 |
| Modified Cellulose Fibers | Substituent (A) | Formula (1) | $R_1$: C3-30 | —$C_4H_9$ | —$C_8H_{17}$ | —$C_8H_{17}$ | —$C_{16}H_{33}$ | — | — |
| | | | Introduction Ratio, Degree of Molar Substitution | 0.37 | 0.40 | 0.68 | 0.26 | — | — |
| | | Formula (2) | $R_1$: C3-30 | — | — | — | — | —$CH_3$ | —$C_8H_{17}$ |
| | | | n: 0-50 | — | — | — | — | 0 | 0 |
| | | | A: C1-6 | — | — | — | — | — | — |
| | | | Introduction Ratio, Degree of Molar Substitution | — | — | — | — | 0.17 | 0.19 |
| | Substituent (B) | Formula (3) | $R_2$: C1-2 | —$CH_3$ | —$CH_3$ | —$CH_3$ | —$CH_3$ | —$CH_3$ | —$CH_3$ |
| | | | Introduction Ratio, Degree of Molar Substitution | 0.06 | 0.35 | 0.06 | 0.06 | 0.06 | 0.06 |
| | Average Fiber Size, μm | | | 24 | 24 | 23 | 24 | 24 | 24 |
| | Cellulose Crystal Form | | | I | I | I | I | I | I |
| | Crystallinity, % | | | 50 | 53 | 48 | 52 | 45 | 47 |
| | Raw Material Cellulose | | | NBKP | NBKP | NBKP | NBKP | NBKP | NBKP |
| Component of Molded Article | Modified Cellulose Fibers, Parts by Mass | | | 10 | 10 | 10 | 10 | 10 | 10 |
| | SBR, Parts by Mass | | | 100 | 100 | 100 | 100 | 100 | 100 |
| | Carbon Black, Parts by Mass | | | 0 | 0 | 0 | 0 | 0 | 0 |
| | Stearic Acid, Parts by Mass | | | 2 | 2 | 2 | 2 | 2 | 2 |
| | Zinc Oxide, Parts by Mass | | | 3 | 3 | 3 | 3 | 3 | 3 |
| | Sulfur, Parts by Mass | | | 1.5 | 1.5 | 1.5 | 1.5 | 1.5 | 1.5 |
| | Vulcanization Accelerator TBBS, Parts by Mass | | | 0.5 | 0.5 | 0.5 | 0.5 | 0.5 | 0.5 |
| | Vulcanization Accelerator MBTS, Parts by Mass | | | 0.5 | 0.5 | 0.5 | 0.5 | 0.5 | 0.5 |
| | Vulcanization Accelerator DPG, Parts by Mass | | | 0.5 | 0.5 | 0.5 | 0.5 | 0.5 | 0.5 |
| Evaluation Results | Relative Storage Modulus at 25° C., Based on Ref. Ex. 6 | | | 1,735 | 1,485 | 2,460 | 3,125 | 210 | 1,910 |
| | Relative tan δ at 25° C., Based on Ref. Ex. 6 | | | 59 | 60 | 57 | 57 | 88 | 55 |

| | | | | Ex. 63 | Ex. 53 | Ex. 64 | Ex. 65 | Ex. 66 |
|---|---|---|---|---|---|---|---|---|
| Preparation Ex. No. of Modified Cellulose Fibers | | | | 14 | 2 | 15 | 2 | 2 |
| Modified Cellulose Fibers | Substituent (A) | Formula (1) | $R_1$: C3-30 | — | — | — | — | — |
| | | | Introduction Ratio, Degree of Molar Substitution | — | — | — | — | — |
| | | Formula (2) | $R_1$: C3-30 | —$C_{12}H_{25}$ | —$C_{18}H_{37}$ | —$C_{18}H_{37}$ | —$C_{18}H_{37}$ | —$C_{18}H_{37}$ |
| | | | n: 0-50 | 13 | 0 | 0 | 0 | 0 |
| | | | A: C1-6 | —$OC_2H_4$— | — | — | — | — |
| | | | Introduction Ratio, Degree of Molar Substitution | 0.21 | 0.33 | 0.32 | 0.33 | 0.33 |
| | Substituent (B) | Formula (3) | $R_2$: C1-2 | —$CH_3$ | —$CH_3$ | —$C_2H_5$ | —$CH_3$ | —$CH_3$ |
| | | | Introduction Ratio, Degree of Molar Substitution | 0.06 | 0.06 | 0.08 | 0.06 | 0.06 |
| | Average Fiber Size, μm | | | 23 | 23 | 24 | 23 | 23 |
| | Cellulose Crystal Form | | | I | I | I | I | I |
| | Crystallinity, % | | | 45 | 48 | 50 | 48 | 48 |
| | Raw Material Cellulose | | | NBKP | NBKP | NBKP | NBKP | NBKP |
| Component of Molded Article | Modified Cellulose Fibers, Parts by Mass | | | 10 | 10 | 10 | 5 | 1 |
| | SBR, Parts by Mass | | | 100 | 100 | 100 | 100 | 100 |
| | Carbon Black, Parts by Mass | | | 0 | 0 | 0 | 0 | 0 |
| | Stearic Acid, Parts by Mass | | | 2 | 2 | 2 | 2 | 2 |
| | Zinc Oxide, Parts by Mass | | | 3 | 3 | 3 | 3 | 3 |
| | Sulfur, Parts by Mass | | | 1.5 | 1.5 | 1.5 | 1.5 | 1.5 |
| | Vulcanization Accelerator TBBS, Parts by Mass | | | 0.5 | 0.5 | 0.5 | 0.5 | 0.5 |
| | Vulcanization Accelerator MBTS, Parts by Mass | | | 0.5 | 0.5 | 0.5 | 0.5 | 0.5 |
| | Vulcanization Accelerator DPG, Parts by Mass | | | 0.5 | 0.5 | 0.5 | 0.5 | 0.5 |
| Evaluation Results | Relative Storage Modulus at 25° C., Based on Ref. Ex. 6 | | | 2,905 | 2,860 | 2,765 | 1,055 | 300 |
| | Relative tan δ at 25° C., Based on Ref. Ex. 6 | | | 60 | 59 | 58 | 72 | 85 |

TABLE 13

| | | | | Ex. 53 | Ex. 67 | Ex. 68 | Ex. 69 | Ex. 70 | Ex. 71 |
|---|---|---|---|---|---|---|---|---|---|
| | | | Rubber-Based Resin: Kneading Method | | | | | | |
| Preparation Ex. No. of Modified Cellulose Fibers | | | | 2 | 16 | 17 | 18 | 19 | 20 |
| Modified Cellulose Fibers | Substituent (A) | Formula (1) | $R_1$: C3-30 | — | — | — | — | — | — |
| | | | Introduction Ratio, Degree of Molar Substitution | — | — | — | — | — | — |
| | | Formula (2) | $R_1$: C3-30 | $-C_{18}H_{37}$ | $-C_{18}H_{37}$ | $-C_{18}H_{37}$ | $-C_{18}H_{37}$ | $-C_{18}H_{37}$ | $-C_{18}H_{37}$ |
| | | | n: 0-50 | 0 | 0 | 0 | 0 | 0 | 0 |
| | | | A: C1-6 | — | — | — | — | — | — |
| | | | Introduction Ratio, Degree of Molar Substitution | 0.33 | 0.33 | 0.36 | 0.40 | 0.38 | 0.35 |
| | Substituent (B) | Formula (3) | $R_2$: C1-2 | $-CH_3$ | $-CH_3$ | $-CH_3$ | $-CH_3$ | $-CH_3$ | $-CH_3$ |
| | | | Introduction Ratio, Degree of Molar Substitution | 0.06 | 0.06 | 0.08 | 0.08 | 0.09 | 0.07 |
| | Average Fiber Size, μm | | | 23 | 24 | 28 | 65 | 25 | <0.1 |
| | Cellulose Crystal Form | | | I | I | I | I | I | I |
| | Crystallinity, % | | | 48 | 55 | 40 | 50 | 31 | 39 |
| | Raw Material Cellulose | | | NBKP | LBKP | HYP | ARBOCEL | Powdery Cellulose | MFC |
| Component of Molded Article | Modified Cellulose Fibers, Parts by Mass | | | 10 | 10 | 10 | 10 | 10 | 10 |
| | SBR, Parts by Mass | | | 100 | 100 | 100 | 100 | 100 | 100 |
| | Carbon Black, Parts by Mass | | | 0 | 0 | 0 | 0 | 0 | 0 |
| | Stearic Acid, Parts by Mass | | | 2 | 2 | 2 | 2 | 2 | 2 |
| | Zinc Oxide, Parts by Mass | | | 3 | 3 | 3 | 3 | 3 | 3 |
| | Sulfur, Parts by Mass | | | 1.5 | 1.5 | 1.5 | 1.5 | 1.5 | 1.5 |
| | Vulcanization Accelerator TBBS, Parts by Mass | | | 0.5 | 0.5 | 0.5 | 0.5 | 0.5 | 0.5 |
| | Vulcanization Accelerator MBTS, Parts by Mass | | | 0.5 | 0.5 | 0.5 | 0.5 | 0.5 | 0.5 |
| | Vulcanization Accelerator DPG, Parts by Mass | | | 0.5 | 0.5 | 0.5 | 0.5 | 0.5 | 0.5 |
| Evaluation Results | Relative Storage Modulus at 25° C., Based on Ref. Ex. 6 | | | 2,860 | 2,930 | 3,100 | 2,055 | 1,860 | 1,450 |
| | Relative tan δ at 25° C., Based on Ref. Ex. 6 | | | 59 | 59 | 57 | 54 | 55 | 61 |

TABLE 14

| | | | | Ex. 53 | Ex. 72 | Ex. 54 | Ex. 73 | Ex. 74 | Ex. 75 |
|---|---|---|---|---|---|---|---|---|---|
| | | | Rubber-Based Resin: Kneading Method | | | | | | |
| Preparation Ex. No. of Modified Cellulose Fibers | | | | 2 | 2 | 3 | 3 | 3 | 3 |
| Modified Cellulose Fibers | Substituent (A) | Formula (1) | $R_1$: C3-30 | — | — | — | — | — | — |
| | | | Introduction Ratio, Degree of Molar Substitution | — | — | — | — | — | — |
| | | Formula (2) | $R_1$: C3-30 | $-C_{18}H_{37}$ | $-C_{18}H_{37}$ | $-C_{18}H_{37}$ | $-C_{18}H_{37}$ | $-C_{18}H_{37}$ | $-C_{18}H_{37}$ |
| | | | n: 0-50 | — | — | — | — | — | — |
| | | | A: C1-6 | — | — | — | — | — | — |
| | | | Introduction Ratio, Degree of Molar Substitution | 0.33 | 0.33 | 0.35 | 0.35 | 0.35 | 0.35 |
| | Substituent (B) | Formula (3) | $R_2$: C1-2 | $-CH_3$ | $-CH_3$ | $-CH_3$ | $-CH_3$ | $-CH_3$ | $-CH_3$ |
| | | | Introduction Ratio, Degree of Molar Substitution | 0.06 | 0.06 | 0.14 | 0.14 | 0.14 | 0.14 |
| | Average Fiber Size, μm | | | 23 | 23 | 24 | 24 | 24 | 24 |
| | Cellulose Crystal Form | | | I | I | I | I | I | I |
| | Crystallinity, % | | | 48 | 48 | 48 | 48 | 48 | 48 |
| | Raw Material Cellulose | | | NBKP | NBKP | NBKP | NBKP | NBKP | NBKP |
| | Pretreatment Before Mixing | | | Absence | Absence | Absence | Absence | Vibrating Mill (Without Water) | Vibrating Mill (Without Water) |
| Component of Molded Article | Modified Cellulose Fibers, Parts by Mass | | | 10 | 10 | 10 | 10 | 10 | 10 |
| | SBR, Parts by Mass | | | 100 | 100 | 100 | 100 | 100 | 100 |
| | Carbon Black, Parts by Mass | | | 0 | 50 | 0 | 50 | 50 | 50 |
| | Stearic Acid, Parts by Mass | | | 2 | 2 | 2 | 2 | 2 | 2 |
| | Zinc Oxide, Parts by Mass | | | 3 | 3 | 3 | 3 | 3 | 3 |
| | Sulfur, Parts by Mass | | | 1.5 | 1.5 | 1.5 | 1.5 | 1.5 | 1.5 |
| | Vulcanization Accelerator TBBS, Parts by Mass | | | 0.5 | 0.5 | 0.5 | 0.5 | 0.5 | 0.5 |
| | Vulcanization Accelerator MBTS, Parts by Mass | | | 0.5 | 0.5 | 0.5 | 0.5 | 0.5 | 0.5 |

TABLE 14-continued

Rubber-Based Resin: Kneading Method

|  |  |  |  |  |  |  |  |
|---|---|---|---|---|---|---|---|
|  | Vulcanization Accelerator DPG, Parts by Mass | 0.5 | 0.5 | 0.5 | 0.5 | 0.5 | 0.5 |
|  | Compatibilizing Agent, Parts by Mass | 0 | 0 | 0 | 0 | 0 | 0 |
|  | Silane Coupling Agent, Parts by Mass | 0 | 0 | 0 | 0 | 0 | 0 |
| Presence or Absence of Kneading Step C | | Absence | Absence | Absence | Absence | Absence | Presence |
| Evaluation Results | Relative Storage Modulus at 25° C., Based on Ref. Ex. 6 | 2,860 | 7,550 | 3,180 | 8,005 | 7,600 | 8,325 |
|  | Relative tan δ at 25° C., Based on Ref. Ex. 6 | 59 | 58 | 60 | 55 | 57 | 60 |

|  |  |  |  |  | Ex. 76 | Ex. 77 | Ex. 78 | Ex. 79 |
|---|---|---|---|---|---|---|---|---|
| Modified Cellulose Fibers | Preparation Ex. No. of Modified Cellulose Fibers | | | | 3 | 3 | 3 | 3 |
|  | Substituent (A) | Formula (1) | $R_1$: C3-30 | | — | — | — | — |
|  |  |  | Introduction Ratio, Degree of Molar Substitution | | — | — | — | — |
|  |  | Formula (2) | $R_1$: C3-30 | | —$C_{18}H_{37}$ | —$C_{18}H_{37}$ | —$C_{18}H_{37}$ | —$C_{18}H_{37}$ |
|  |  |  | n: 0-50 | | — | — | — | — |
|  |  |  | A: C1-6 | | — | — | — | — |
|  |  |  | Introduction Ratio, Degree of Molar Substitution | | 0.35 | 0.35 | 0.35 | 0.35 |
|  | Substituent (B) | Formula (3) | $R_2$: C1-2 | | —$CH_3$ | —$CH_3$ | —$CH_3$ | —$CH_3$ |
|  |  |  | Introduction Ratio, Degree of Molar Substitution | | 0.14 | 0.14 | 0.14 | 0.14 |
|  | Average Fiber Size, μm | | | | 24 | 24 | 24 | 24 |
|  | Cellulose Crystal Form | | | | I | I | I | I |
|  | Crystallinity, % | | | | 48 | 48 | 48 | 48 |
|  | Raw Material Cellulose | | | | NBKP | NBKP | NBKP | NBKP |
|  | Pretreatment Before Mixing | | | | Vibrating Mill (Water 50 Parts by Mass) | Vibrating Mill (Water 50 Parts by Mass) | Absence | Absence |
| Component of Molded Article | Modified Cellulose Fibers, Parts by Mass | | | | 10 | 10 | 10 | 10 |
|  | SBR, Parts by Mass | | | | 100 | 100 | 100 | 100 |
|  | Carbon Black, Parts by Mass | | | | 50 | 50 | 50 | 50 |
|  | Stearic Acid, Parts by Mass | | | | 2 | 2 | 2 | 2 |
|  | Zinc Oxide, Parts by Mass | | | | 3 | 3 | 3 | 3 |
|  | Sulfur, Parts by Mass | | | | 1.5 | 1.5 | 1.5 | 1.5 |
|  | Vulcanization Accelerator TBBS, Parts by Mass | | | | 0.5 | 0.5 | 0.5 | 0.5 |
|  | Vulcanization Accelerator MBTS, Parts by Mass | | | | 0.5 | 0.5 | 0.5 | 0.5 |
|  | Vulcanization Accelerator DPG, Parts by Mass | | | | 0.5 | 0.5 | 0.5 | 0.5 |
|  | Compatibilizing Agent, Parts by Mass | | | | 0 | 0 | 2 | 0 |
|  | Silane Coupling Agent, Parts by Mass | | | | 0 | 0 | 0 | 2 |
| Presence or Absence of Kneading Step C | | | | | Absence | Presence | Absence | Absence |
| Evaluation Results | Relative Storage Modulus at 25° C., Based on Ref. Ex. 6 | | | | 8,420 | 8,860 | 8,250 | 8,460 |
|  | Relative tan δ at 25° C., Based on Ref. Ex. 6 | | | | 54 | 55 | 58 | 58 |

TABLE 15

Rubber-Based Resin: Kneading Method

|  |  |  |  |  | Ex. 80 | Ex. 81 | Ex. 82 | Ex. 83 | Ex. 84 | Ref. Ex. 8 | Ref. Ex. 9 |
|---|---|---|---|---|---|---|---|---|---|---|---|
| Preparation Ex. No. of Modified Cellulose Fibers | | | | | 3 | 3 | 3 | 3 | 3 | — | — |
| Modified Cellulose Fibers | Substituent (A) | Formula (1) | $R_1$: C3-30 | | — | — | — | — | — | — | — |
|  |  |  | Introduction Ratio, Degree of Molar Substitution | | — | — | — | — | — | — | — |
|  |  | Formula (2) | $R_1$: C3-30 | | —$C_{18}H_{37}$ | —$C_{18}H_{37}$ | —$C_{18}H_{37}$ | —$C_{18}H_{37}$ | —$C_{18}H_{37}$ | — | — |
|  |  |  | n: 0-50 | | — | — | — | — | — | — | — |
|  |  |  | A: C1-6 | | — | — | — | — | — | — | — |
|  |  |  | Introduction Ratio, Degree of Molar Substitution | | 0.35 | 0.35 | 0.35 | 0.35 | 0.35 | — | — |
|  | Substituent (B) | Formula (3) | $R_2$: C1-2 | | —$CH_3$ | —$CH_3$ | —$CH_3$ | —$CH_3$ | —$CH_3$ | — | — |
|  |  |  | Introduction Ratio, Degree of Molar Substitution | | 0.14 | 0.14 | 0.14 | 0.14 | 0.14 | — | — |
|  | Average Fiber Size, μm | | | | 24 | 24 | 24 | 24 | 24 | — | — |
|  | Cellulose Crystal Form | | | | I | I | I | I | I | — | — |

TABLE 15-continued

Rubber-Based Resin: Kneading Method

|  |  | Ex. 80 | Ex. 81 | Ex. 82 | Ex. 83 | Ex. 84 | Ref. Ex. 8 | Ref. Ex. 9 |
|---|---|---|---|---|---|---|---|---|
|  | Crystallinity, % | 48 | 48 | 48 | 48 | 48 | — | — |
|  | Raw Material Cellulose | NBKP | NBKP | NBKP | NBKP | NBKP | — | — |
|  | Pretreatment Before Mixing | Absence | Absence | Vibrating Mill (Without Water) | Vibrating Mill (Water 50 Parts by Mass) | Vibrating Mill (Water 50 Parts by Mass) | — | — |
| Component of Molded Article | Modified Cellulose Fibers, Parts by Mass | 10 | 10 | 10 | 10 | 10 | 0 | 0 |
|  | NR, Parts by Mass | 100 | 100 | 100 | 100 | 100 | 100 | 100 |
|  | Carbon Black, Parts by Mass | 0 | 50 | 50 | 50 | 50 | 0 | 50 |
|  | Stearic Acid, Parts by Mass | 2 | 2 | 2 | 2 | 2 | 2 | 2 |
|  | Zinc Oxide, Parts by Mass | 3 | 3 | 3 | 3 | 3 | 3 | 3 |
|  | Sulfur, Parts by Mass | 1.5 | 1.5 | 1.5 | 1.5 | 1.5 | 1.5 | 1.5 |
|  | Vulcanization Accelerator TBBS, Parts by Mass | 0.5 | 0.5 | 0.5 | 0.5 | 0.5 | 0.5 | 0.5 |
|  | Vulcanization Accelerator MBTS, Parts by Mass | 0.5 | 0.5 | 0.5 | 0.5 | 0.5 | 0.5 | 0.5 |
|  | Vulcanization Accelerator DPG, Parts by Mass | 0.5 | 0.5 | 0.5 | 0.5 | 0.5 | 0.5 | 0.5 |
| Presence or Absence of Kneading Step C |  | Absence | Absence | Absence | Absence | Presence | Absence | Absence |
| Evaluation Results | Relative Storage Modulus at 25° C., Based on Ref. Ex. 8 | 4,235 | 8,105 | 8,030 | 9,125 | 9,325 | 100 | 755 |
|  | Relative tan δ at 25° C., Based on Ref. Ex. 8 | 60 | 58 | 57 | 58 | 60 | 100 | 90 |

It can be seen from Tables 1 to 3 that the modified cellulose fibers of the present invention are excellent in dispersion stability in a low polarity organic solvent, and thickening action. In addition, it can be seen from Tables 4 to 15 that the formation of the modified cellulose and resins into a composite can exhibit high strength and dimensional stability in a wide range of applications regardless the kinds of resins or a method of forming a composite. Particularly, since the resin composition obtained via melt-kneading under high temperatures exhibits high strength (Example 46), it is suggested that the modified cellulose fibers of the present invention have high thermal stability.

INDUSTRIAL APPLICABILITY

The modified cellulose fibers of the present invention have high dispersibility to organic solvents or resins, and can exhibit thickening effects and strength reinforcing effects, so that the modified cellulose fibers are suitable as various thickeners, fillers and the like. In addition, the resin composition blended with the modified cellulose fibers can be suitably used in variously industrial applications such as daily sundries, household electric appliance parts, wrapping materials for household electric appliance parts and automobile parts.

The invention claimed is:

1. Modified cellulose fibers, wherein each of
(A) one or more substituents selected from substituents represented by the following general formula (1) and substituents represented by the following general formula (2):

$$—CH_2—CH(OH)—R_1 \quad (1)$$

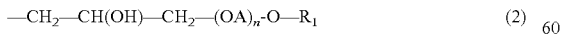

$$—CH_2—CH(OH)—CH_2—(OA)_n-O—R_1 \quad (2)$$

wherein each $R_1$ in the general formula (1) and the general formula (2) is independently a linear or branched alkyl group having 3 or more carbon atoms and 30 or less carbon atoms; n in the general formula (2) is a number of 0 or more and 50 or less; and A is a linear or branched, divalent saturated hydrocarbon group having 1 or more carbon atoms and 6 or less carbon atoms, and (B) a substituent represented by the following general formula (3):

$$—CH_2—CH(OH)—R_2 \quad (3)$$

wherein $R_2$ in the general formula (3) is an alkyl group having 1 or more carbon atoms and 2 or less carbon atoms,
is independently bonded to cellulose fibers via an ether bond, wherein the modified cellulose fibers have a cellulose I crystal structure and wherein the crystallinity is 10% or more,
wherein the introduction ratio of the substituent represented by the general formula (3), per mol of the anhydrous glucose unit of the cellulose is 1.0 mol or less.

2. The modified cellulose fibers according to claim 1, which are modified cellulose fibers represented by the following general formula (4):

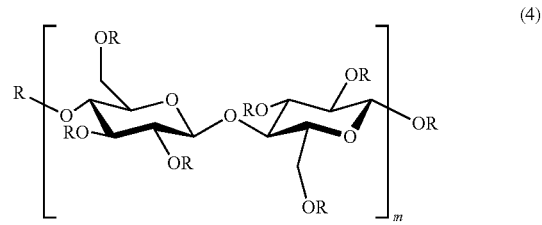

wherein R, which may be identical or different, is hydrogen, or (A) a substituent selected from substituents represented by the general formula (1) defined above and substituents represented by the general formula (2) defined above, or (b) a substituent represented by the general formula (3) defined above; and m is an integer of 20 or more and 3,000 or less, with proviso that a case where all R's are simultaneously hydrogens, a case where all are simultaneously substituents (A), and a case where all are simultaneously a substituent (B) are excluded.

3. The modified cellulose fibers according to claim 1, wherein the introduction ratio of the substituent or substituents selected from substituents represented by the general formula (1) and substituents represented by the general formula (2) is 0.001 mol or more and 1.5 mol or less, per mol of the anhydrous glucose unit.

4. The modified cellulose fibers according to claim 1, wherein n is a number of 0 or more and 20 or less, and A is a linear or branched, divalent saturated hydrocarbon group having 2 or more carbon atoms and 3 or less carbon atoms, in the substituent represented by the general formula (2).

5. The modified cellulose fibers according to claim 1, wherein the average fiber size is 5 μm or more.

6. The modified cellulose fibers according to claim 1, wherein the average fiber size is 5 μm or more and 100 μm or less.

7. The modified cellulose fibers according to claim 1, wherein the average fiber size is 1 nm or more and 500 nm or less.

8. The modified cellulose fibers according to claim 1, wherein the average fiber size is 3 nm or more and 300 nm or less.

9. The modified cellulose fibers according to claim 1, wherein $R_1$ in the general formula (1) has the number of carbon atoms of 4 or more and 20 or less.

10. The modified cellulose fibers according to claim 1, wherein $R_1$ in the general formula (2) has the number of carbon atoms of 4 or more and 20 or less.

11. The modified cellulose fibers according to claim 1, wherein A in the general formula (2) has the number of carbon atoms of 2 or more and 4 or less.

12. The modified cellulose fibers according to claim 1, wherein the introduction ratio of the substituent or substituents selected from substituents represented by the general formula (1) and substituents represented by the general formula (2) is 0.01 mol or more, per mol of the anhydrous glucose unit.

13. The modified cellulose fibers according to claim 1, wherein the crystallinity is 20% or more.

14. The modified cellulose fibers according to claim 1, wherein the crystallinity is in the range 20% to 75%.

15. A resin composition comprising a thermoplastic resin or curable resin and modified cellulose fibers as defined in claim 1.

16. The resin composition according to claim 15, wherein the thermoplastic resin or curable resin is one or more resins selected from the group consisting of a thermoplastic resin, and a curable resin selected from an epoxy resin, a (meth) acrylic resin, a phenolic resin, an unsaturated polyester resin, a polyurethane resin, or a polyimide resin.

* * * * *